United States Patent
Nakata et al.

(10) Patent No.: US 12,005,726 B2
(45) Date of Patent: Jun. 11, 2024

(54) INK JET RECORDING METHOD AND INK JET RECORDING APPARATUS

(71) Applicant: CANON KABUSHIKI KAISHA, Tokyo (JP)

(72) Inventors: Eiichi Nakata, Kanagawa (JP); Eriko Yoshino, Kanagawa (JP); Ryo Tsujii, Tokyo (JP); Yoshitaka Torisaka, Tokyo (JP); Masanori Yoshida, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 108 days.

(21) Appl. No.: 17/903,257

(22) Filed: Sep. 6, 2022

(65) Prior Publication Data

US 2023/0077739 A1 Mar. 16, 2023

(30) Foreign Application Priority Data

Sep. 9, 2021 (JP) ................................ 2021-147158
Sep. 9, 2021 (JP) ................................ 2021-147159
Aug. 10, 2022 (JP) ................................ 2022-127993

(51) Int. Cl.
*C09D 11/104* (2014.01)
*B41J 11/00* (2006.01)
(Continued)

(52) U.S. Cl.
CPC ........... *B41M 7/009* (2013.01); *C09D 11/104* (2013.01); *C09D 11/106* (2013.01);
(Continued)

(58) Field of Classification Search
CPC ...... B41M 7/009; B41M 5/0011; B41M 5/50; B41M 5/52; C09D 11/104; C09D 11/106;
(Continued)

(56) References Cited

U.S. PATENT DOCUMENTS 7,615,113 B2  11/2009 Aikawa et al.
8,114,208 B2   2/2012 Nakata et al.
(Continued)

FOREIGN PATENT DOCUMENTS

JP    2005-220352 A    8/2005
JP    2012-251049 A    12/2012
(Continued)

*Primary Examiner* — Yaovi M Ameh
(74) *Attorney, Agent, or Firm* — Venable LLP

(57) ABSTRACT

The ink jet recording method includes ejecting an aqueous ink from a recording head to apply the aqueous ink to a recording medium, to thereby record an image. The ink jet recording method includes: ejecting the aqueous ink heated to a temperature $T_H$ (° C.) from the recording head to apply the aqueous ink to the recording medium; and heating the recording medium having the aqueous ink applied thereto to a temperature $T_F$ (° C.), the aqueous ink containing a pigment and a polyester resin particle, a glass transition temperature $T_G$ (° C.) of the polyester resin particle, the temperature $T_H$ (° C.) and the temperature $T_F$ (° C.) satisfying relationships of the following expressions (1) to (3).

$$T_G(° C.) > T_H(° C.) \quad (1)$$

$$T_F(° C.) \geq T_H(° C.) + 10° C. \quad (2)$$

$$T_F(° C.) \geq T_G(° C.) - 10° C. \quad (3)$$

10 Claims, 2 Drawing Sheets

(51) Int. Cl.
*B41M 7/00* (2006.01)
*C09D 11/106* (2014.01)
*C09D 11/322* (2014.01)
*B41M 5/00* (2006.01)
*B41M 5/50* (2006.01)
*B41M 5/52* (2006.01)
*C09D 11/12* (2006.01)

(52) U.S. Cl.
CPC ....... *C09D 11/322* (2013.01); *B41J 11/00216* (2021.01); *B41M 5/0011* (2013.01); *B41M 5/50* (2013.01); *B41M 5/52* (2013.01); *C09D 11/12* (2013.01)

(58) Field of Classification Search
CPC ... C09D 11/322; C09D 11/12; B41J 11/00216
See application file for complete search history.

(56) References Cited

U.S. PATENT DOCUMENTS

| | | |
|---|---|---|
| 8,440,742 B2 | 5/2013 | Cagle |
| 8,602,546 B2 | 12/2013 | Shimizu et al. |
| 8,602,547 B2 | 12/2013 | Nakata et al. |
| 8,834,621 B2 | 9/2014 | Takebayashi et al. |
| 9,187,662 B2 | 11/2015 | Yamamoto et al. |
| 9,259,921 B2 | 2/2016 | Shirakawa et al. |
| 9,598,592 B2 | 3/2017 | Nakata et al. |
| 9,605,170 B2 | 3/2017 | Nakagawa et al. |
| 9,738,803 B2 | 8/2017 | Horiuchi et al. |
| 9,969,182 B2 | 5/2018 | Torisaka et al. |
| 10,017,656 B2 | 7/2018 | Torisaka et al. |
| 10,065,412 B2 | 9/2018 | Shinjo et al. |
| 10,280,326 B2 | 5/2019 | Saito et al. |
| 10,654,288 B2 | 5/2020 | Nakata et al. |
| 2005/0176847 A1 | 8/2005 | Cagle |
| 2009/0153613 A1* | 6/2009 | Yamanobe ............ B41J 2/2114 347/21 |
| 2015/0367632 A1 | 12/2015 | Shirakawa et al. |
| 2019/0009591 A1 | 1/2019 | Yoshida et al. |
| 2020/0248022 A1* | 8/2020 | Ishida .................. C09D 11/108 |
| 2021/0179873 A1* | 6/2021 | Fujita .................. B41J 2/14233 |

FOREIGN PATENT DOCUMENTS

| | | | |
|---|---|---|---|
| JP | 2015205469 A * | 11/2015 | ............. B41M 5/00 |
| JP | 2016-002738 A | 1/2016 | |

* cited by examiner

INK JET RECORDING METHOD AND INK JET RECORDING APPARATUS

BACKGROUND OF THE DISCLOSURE

Field of the Discloser

The present disclosure relates to an ink jet recording method and an ink jet recording apparatus.

Description of the Related Art

In recent years, an ink jet recording method has been increasingly used in the field of signs & displays, such as recording of a poster or a large-size advertisement. In this field, a polyvinyl chloride sheet, a polyethylene terephthalate (PET) sheet or the like is often used as a recording medium from the viewpoints of, for example, the durability and cost of the recording medium. Each of those recording media has no or nearly no aqueous ink-absorbing layer on the recording surface of the recording medium, and is what is called a non-absorbent recording medium (recording medium having no property of absorbing an aqueous ink) or a low-absorbent recording medium (recording medium having a low property of absorbing an aqueous ink). In the recording of an image on any of those recording media, hitherto, a solvent-based ink, a curable ink or the like has been used. However, from the viewpoint of reducing an environmental load, an odor and the like, there is an increasing need for an aqueous ink using an aqueous medium.

There is a demand that an image to be used in the field of signs & displays have excellent abrasion resistance. In order to meet such demand, for example, there are proposals of an ink containing an acrylic resin particle and a method involving applying the ink to a low- to non-absorbent recording medium to record an image and then heating the recorded image (Japanese Patent Application Laid-Open No. 2005-220352). In addition, there is a proposal of an ink containing an alkyl polyol having a boiling point falling within a predetermined range, the ink being capable of recording an image excellent in abrasion resistance while being suppressed from sticking in a recording head (Japanese Patent Application Laid-Open No. 2012-251049).

Meanwhile, when an image is recorded using a recording head configured to eject an aqueous ink through action of thermal energy, among a plurality of recording elements each configured to generate thermal energy (heaters for ejection), a more frequently used recording element and a less frequently used recording element have a temperature difference generated therebetween. Besides, the thus generated temperature difference generates a difference between ejection amounts of the ink from ejection orifices corresponding to the recording elements, sometimes resulting in "unevenness" in the image to be recorded. In order to eliminate such difference between the ejection amounts of the ink, for example, there is a proposal of a method involving recording an image while performing heating control of the temperatures of a recording head and an ink in the recording head (hereinafter sometimes referred to as "temperature regulation") (Japanese Patent Application Laid-Open No. 2016-002738).

However, it has been found that, when the ink proposed in Japanese Patent Application Laid-Open No. 2005-220352 is ejected from the recording head configured to eject an ink through action of thermal energy and is applied to a recording medium, "unevenness" is liable to be generated in the image to be recorded, and besides, the abrasion resistance of the portion of the generated "unevenness" is reduced. In addition, it has been found that, when the ink proposed in Japanese Patent Application Laid-Open No. 2005-220352 is ejected from the recording head subjected to temperature regulation, "unevenness" is less liable to be generated in the image to be recorded, and the abrasion resistance of the image is improved. However, it has been found that, when the ink is continuously ejected for a long period of time from the recording head subjected to temperature regulation, the ink becomes liable to stick in the vicinity of the ejection orifice, and hence the ejection stability of the ink is reduced.

SUMMARY OF THE DISCLOSURE

Accordingly, an object of the present disclosure is to provide an ink jet recording method that, despite using a recording head having a mechanism configured to heat an ink has satisfactory ejection stability of the ink and can record an image excellent in abrasion resistance on a low- to non-absorbent recording medium. In addition, another object of the present disclosure is to provide an ink jet recording apparatus to be used in the ink jet recording method.

That is, according to the present disclosure, there is provided an ink jet recording method including ejecting an aqueous ink from a recording head of an ink jet system through action of thermal energy to apply the aqueous ink to a recording medium, to thereby record an image, the ink jet recording method including: ejecting the aqueous ink heated to a temperature $T_H$ (° C.) from the recording head to apply the aqueous ink to the recording medium; and heating the recording medium having the aqueous ink applied thereto to a temperature $T_F$ (° C.), the aqueous ink containing a pigment and a polyester resin particle, the polyester resin particle having a ratio of a weight average molecular weight to a number average molecular weight of 6.0 or less, a glass transition temperature $T_G$ (° C.) of the polyester resin particle, the temperature $T_H$ (° C.) and the temperature $T_F$ (° C.) satisfying relationships of the following expressions (1) to (3), a heat quantity ((W·h)/g) to be applied to the aqueous ink applied to the recording medium being 2 (W·h)/g or more, the recording medium having a water absorption amount of 10 mL/m² or less in a Bristow method from start of contact to 30 msec$^{1/2}$.

$$T_G(° C.) > T_H(° C.) \tag{1}$$

$$T_F(° C.) \geq T_H(° C.) + 10° C. \tag{2}$$

$$T_F(° C.) \geq T_G(° C.) - 10° C. \tag{3}$$

According, to the present disclosure, the ink jet recording method that, despite using a recording head having a mechanism configured to heat an ink, has satisfactory ejection stability of the ink and can record an image excellent in abrasion resistance on a low- to non-absorbent recording medium can be provided. In addition, according to the present disclosure, the ink jet recording apparatus to be used in the ink jet recording method can be provided.

Further features of the present disclosure will become apparent from the following description of exemplary embodiments with reference to the attached drawings.

DESCRIPTION OF THE EMBODIMENTS

Figure 1:
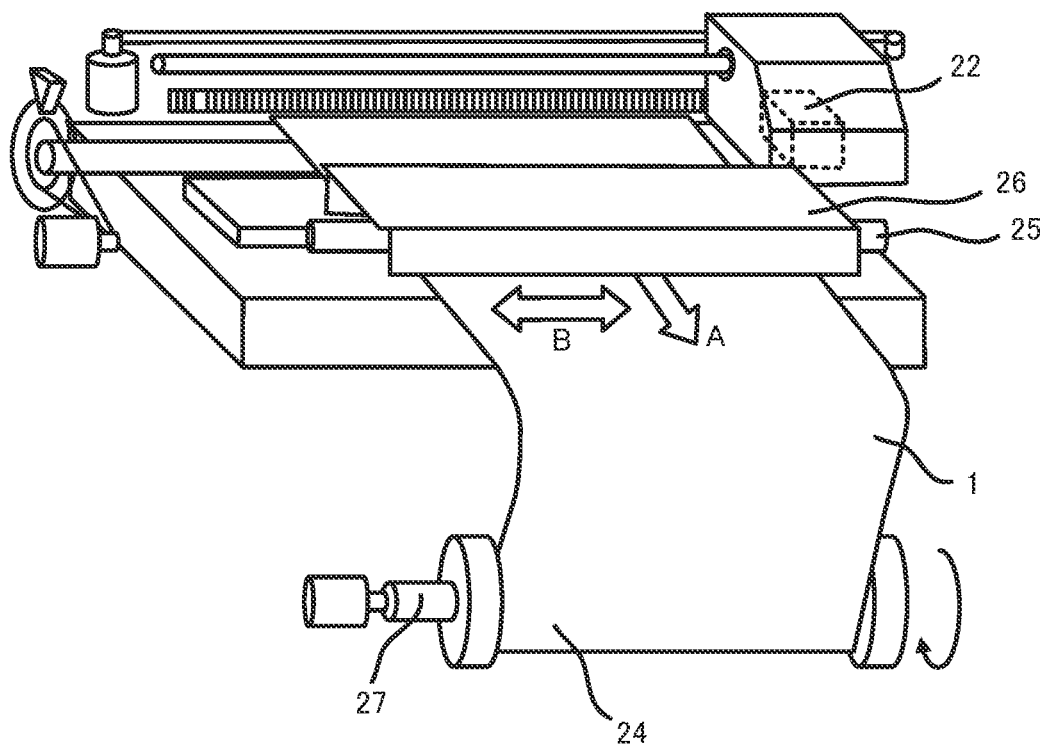
FIG. 1 is a perspective view for schematically illustrating an ink jet recording apparatus according to one embodiment of the present disclosure.

The present disclosure is described in more detail below by way of exemplary embodiments. In the present disclosure, when a compound is a salt, the salt is present as dissociated ions in an ink, but the expression "contain a salt" is used for convenience. In addition, an aqueous ink for ink jet is sometimes referred to simply as "ink". Physical property values are values at normal temperature (25° C.) and normal pressure (1 atm), unless otherwise stated.

In addition, as used herein, the term "unit" means a unit structure corresponding to one monomer unless otherwise stated. The descriptions "(meth)acrylic acid" and "(meth)acrylate" refer to "acrylic acid or methacrylic acid" and "acrylate or methacrylate", respectively. A polyester resin widely used in an aqueous ink for ink jet is formed of a unit derived from a polyhydric alcohol and a unit derived from a polyvalent carboxylic acid. A structure containing an ester bond (—COO—), which is formed of the unit derived from a polyhydric alcohol and the unit derived from a polyvalent carboxylic acid, is sometimes called an "ester unit".

Further, herein, low-absorbent to non-absorbent recording media are sometimes collectively referred to as "non-absorbent recording medium". A low-absorbent to non-absorbent recording medium is defined as having a water absorption amount of 10 mL/m² or less in a Bristow method from the start of contact to 30 msec$^{1/2}$.

The inventors investigated the cause of the sticking of the ink in the vicinity of the ejection orifice in the case where the ink proposed in Japanese Patent Application Laid-Open No. 2005-220352 (referred to as 'ink containing an acrylic resin A') was continuously ejected for a long period of time from the recording head subjected to temperature regulation. The inventors observed an ejection orifice at which non-ejection was caused by the sticking of the ink, and as a result, found that part of acrylic resin particles A in the ink fused to each other to block the ejection orifice. In this case, the glass transition temperature ($T_G$(° C.)) of the acrylic resin particle A in the ink was lower than the temperature of the recording head subjected to temperature regulation (temperature ($T_H$(° C.)) of the ink in the recording head) (by about 10° C.). Accordingly, in the vicinity of the ejection orifice of the recording head subjected to temperature regulation to a temperature equal to or higher than the glass transition temperature ($T_G$ (° C.)) of the acrylic resin particle A in the ink, a liquid component in the ink is rapidly evaporated to concentrate the acrylic resin particle A. It is conceived that, at that time, part of the concentrated acrylic resin particles melted to stick at the ejection orifice.

In view of the foregoing, an acrylic resin particle B having a glass transition temperature ($T_G$ (° C.)) slightly higher (higher by about 20° C.) than the temperature ($T_H$(° C.)) of the ink in the recording head and an acrylic resin particle C having a glass transition temperature ($T_G$(° C.)) sufficiently higher (higher by about 50° C.) were each used to prepare an ink. The ink was used and evaluated for its ejection stability from the recording head. As a result, it was found that the ejection stability of the ink containing the acrylic resin particle B was not improved, but the ejection stability of the ink containing the acrylic resin particle C was improved. That is, to ensure the ejection stability of the ink, it is necessary to use an acrylic resin particle with a glass transition temperature ($T_G$ (° C.)) sufficiently higher than the temperature ($T_H$ (° C.)) of the ink in the recording head.

Next, recording media having applied thereto the inks containing the above-mentioned three kinds of acrylic resin particles different from each other in glass transition temperature ($T_G$ (° C.)) were each heated at a predetermined fixation temperature ($T_F$ (° C.)) to sufficiently dry the ink, and the abrasion resistance of the image was observed. As a result, it was revealed that the abrasion resistance of the image recorded using the ink containing the acrylic resin C had not reached a sufficient level. The film formation state of the acrylic resin particle in the recorded image was observed using an electron microscope, and as a result, it was found that fusion between the acrylic resin particles C was insufficient.

Further, the required fixation temperature $T_F$ (° C.) was increased to such a degree as to allow the acrylic resin particles C to fuse to each other. As a result, it was found that a vinyl chloride sheet serving as a typical example of a non-absorbent recording medium shrank owing to heat. It was found that a wave of protrusions and depressions on the recorded product, and the image was rubbed at the protrusions by an external force to reduce the abrasion resistance. That is, it was revealed that, when a fixation temperature ($T_F$ (° C.)) at which the recording medium such as the vinyl chloride sheet was less liable to be damaged by heat was adopted, the ink containing the acrylic resin particle was not able to achieve both of the ejection stability of the ink and the abrasion resistance of the image to be recorded.

Then, with attention focused on the kind of the resin particle, the inventors aimed to achieve both of the ejection stability of the ink from the recording head subjected to temperature regulation and the abrasion resistance of the image to be recorded. Specifically, an investigation was made with attention focused on a polyester resin particle predicted to have a narrower temperature range for softening than the acrylic resin particle. A general polyester resin is produced through an alternate reaction of a polyvalent carboxylic acid component (monomer A) and a polyhydric alcohol component (monomer B). Accordingly, the polyester resin has a narrower molecular weight distribution as compared to the acrylic resin produced through copolymerization because the state of monomer units in the resin is ABABAB in many cases, That is, it is conceived that the polyester resin has a narrower temperature range for softening than the acrylic resin by virtue of having a sharp molecular weight distribution and high compositional uniformity. In the present disclosure, of the polyester resin particles, one having a ratio of its weight average molecular weight (Mw) to its number average molecular weight (Mn) as small as 6.0 or less is used. When the value of the Mw/Mn ratio is more than 6.0, the molecular weight distribution is too broad for the softening temperature of the resin particle to fall within a desired range, and hence the ejection stability of the ink and the abrasion resistance of the image cannot both be achieved.

An ink containing a polyester resin particle having a glass transition temperature ($T_G$ (° C.)) slightly higher (higher by about 20° C.) than the temperature ($T_H$ (° C.)) of the ink in the recording head was prepared. With use of this ink, the ejection stability of the ink and the abrasion resistance of the image to be recorded were evaluated at a fixation temperature ($T_F$ (° C.) (about 90° C.) at which the recording medium such as the vinyl chloride sheet was less liable to be damaged by heat. As a result, it was revealed that, unlike the case in which the ink containing the acrylic resin particle was used, both of the ejection stability and the abrasion resistance were achieved.

The acrylic resin particle has a wider temperature range for softening than the polyester resin particle when their glass transition temperatures are the same. That is, as compared to the polyester resin particle, the acrylic resin particle has a lower softening start temperature and a higher softening end temperature. Accordingly, in order to suppress the fusion of the acrylic resin particle in the ink in the recording head subjected to temperature regulation, an acrylic resin particle having a softening start temperature higher than the temperature ($T_H$ (° C.)) of the ink in the recording head needs to be used. The glass transition temperature ($T_G$ (° C.)) of such acrylic resin particle is sufficiently higher than the temperature ($T_H$ (° C.)) of the ink in the recording head, and hence the softening end temperature also becomes even higher and the $T_F$ (° C.) for causing the resin particles to fuse to each other also becomes even higher. Meanwhile, the softening start temperature of the polyester resin particle is higher as compared to an acrylic resin particle having the same glass transition temperature ($T_G$ (° C.)). Further, the softening end temperature of the polyester resin particle is lower as compared to an acrylic resin particle having the same glass transition temperature ($T_G$ (° C.)). Conceivably because of the foregoing, in the case where the ink containing the polyester resin particle was used, ejection stability and abrasion resistance of the image was improved as compared to the case where the ink containing the acrylic resin particle having a comparable glass transition temperature ($T_G$ (° C.)) was used.

However, from the viewpoint of achieving both of the ejection stability and the abrasion resistance at higher levels, even when the polyester resin particle is used, the difference between the fixation temperature ($T_F$ (° C.)) and the temperature ($T_H$ (° C.)) of the ink in the recording head needs to be set large. Specifically, the temperature of the recording head subjected to temperature regulation (temperature ($T_H$ (° C.) of the ink to be ejected from the recording head) and the heating temperature $T_F$ (° C.) of the recording medium having the ink applied thereto need to satisfy the relationship of the following expression (2).

$$T_F(° C.) \geq T_H(° C.)+10° C. \qquad (2)$$

When the difference between the fixation temperature ($T_F$ (° C.)) and the temperature ($T_H$ (° C.)) of the ink in the recording head is less than 10° C., such a situation as described below occurs. That is, in the case where a polyester resin particle having such a glass transition temperature ($T_G$ (° C.)) as to sufficiently fuse at the fixation temperature ($T_F$ (° C.)) is used, the ejection stability of the ink is reduced. In addition, when the difference between the fixation temperature ($T_F$ (° C.)) and the temperature ($T_H$ (° C.)) of the ink in the recording head is less than 10° C. such a situation as described below occurs. That is, in the case where a polyester resin particle having such a glass transition temperature ($T_G$ (° C.)) as not to fuse at the temperature ($T_H$ (° C.)) of the ink in the recording head is used, the polyester resin particle does not sufficiently fuse even when heated at the fixation temperature ($T_F$ (° C.)), and hence the abrasion resistance of the image is reduced.

Further, from the viewpoint of improving the abrasion resistance of the image, the heating temperature $T_F$ (° C.) of the recording medium having the ink applied thereto and the glass transition temperature $T_G$ (° C.) of the polyester resin particle need to satisfy the relationship of the following expression (3).

$$T_F(° C.) \geq T_G(° C.)-10° C. \qquad (3)$$

In order to investigate the influences of aqueous media (water and a water-soluble organic solvent) on the fusibility of a resin particle, the inventors measured a change in glass transition temperature (° C.) with attention focused on the SP values (unit: $(cal/cm^3)^{1/2}$ of the resin particle and the aqueous media calculated by Fedors' method. The glass transition temperature (° C.) of the resin particle was measured using a differential scanning calorimeter (DSC). With reference to the glass transition temperature (° C.) of a powdered resin (glass transition temperature of the resin itself), the glass transition temperature (° C.) of the resin in the case of mixing the powdered resin and an aqueous medium at a mass ratio of 1:1 was measured and compared. A resin particle formed of an acrylic resin (acrylic resin particle) and a resin particle formed of a polyester resin (polyester resin particle) were each used as the resin.

As a result of the investigation, it was found that water reduced the glass transition temperature of the resin by 10° C. or more, and that the water-soluble organic solvent widely used in an aqueous ink for ink jet tended to more greatly reduce the glass transition temperature of the resin than water. In order to enhance the abrasion resistance of the image, it is important to cause the polyester resin particle to sufficiently fuse. Besides, as described above, it may be said that the aqueous medium to be used in the aqueous ink for ink jet reduces the $T_G$ (° C.) of the polyester resin by 10° C. or more. Accordingly, it is important for causing the resin particle to sufficiently fuse that the heating temperature $T_F$ (° C.) of the recording medium having the ink applied thereto and the glass transition temperature $T_G$ (° C.) of the polyester resin particle satisfy the relationship of the expression (3).

In addition, from the viewpoint of sufficiently drying the ink, a heat quantity ((W·h)/g) to be applied to the ink applied to the recording medium needs to be set to 2 (W·h)/g or more. When the heat quantity to be applied to the ink is less than 2 (W·h)/g, the ink applied to the recording medium is not sufficiently dried, and hence the abrasion resistance of the image to be recorded becomes insufficient.

Ink Jet Recording Method and Ink Jet Recording Apparatus

An ink jet recording method of the present disclosure includes ejecting an aqueous ink from a recording head of an ink jet system through action of thermal energy to apply the aqueous ink to a recording medium, to thereby record an image. The ink jet recording method of the present disclosure includes: ejecting the aqueous ink heated to a temperature $T_H$ (° C.) from the recording head to apply the aqueous ink to the recording medium; and heating the recording medium having the aqueous ink applied thereto to a temperature $T_F$ (° C.). The aqueous ink contains a pigment and a polyester resin particle, and the polyester resin particle has a ratio of a weight average molecular weight to a number average molecular weight of 6.0 or less. In addition, a glass transition temperature $T_G$ (° C.) of the polyester resin particle, the temperature $T_H$ (° C.) and the temperature $T_F$ (° C.) satisfy relationships of the following expressions (1) to (3). In addition, an ink jet recording apparatus of the present disclosure is an apparatus to be used for an ink jet recording method involving ejecting an aqueous ink from a recording head of an ink jet system through action of thermal energy to apply the aqueous ink to a recording medium, to thereby record an image, and is an apparatus to be suitably used for the above-mentioned recording method. There is no need to perform a step of applying, for example, a coating liquid containing no coloring material besides the ink or a step of curing the image through irradiation with an active energy ray or the like. The ink jet recording method and the ink jet recording apparatus of the present disclosure (hereinafter sometimes referred to simply as "recording method and recording apparatus") are described in detail below.

$$T_G(°C.)>T_H(°C.) \tag{1}$$

$$T_F(°C.) \geq T_H(°C.)+10°C. \tag{2}$$

$$T_F(°C.) \geq T_G(°C.)-10°C. \tag{3}$$

Figure 2:
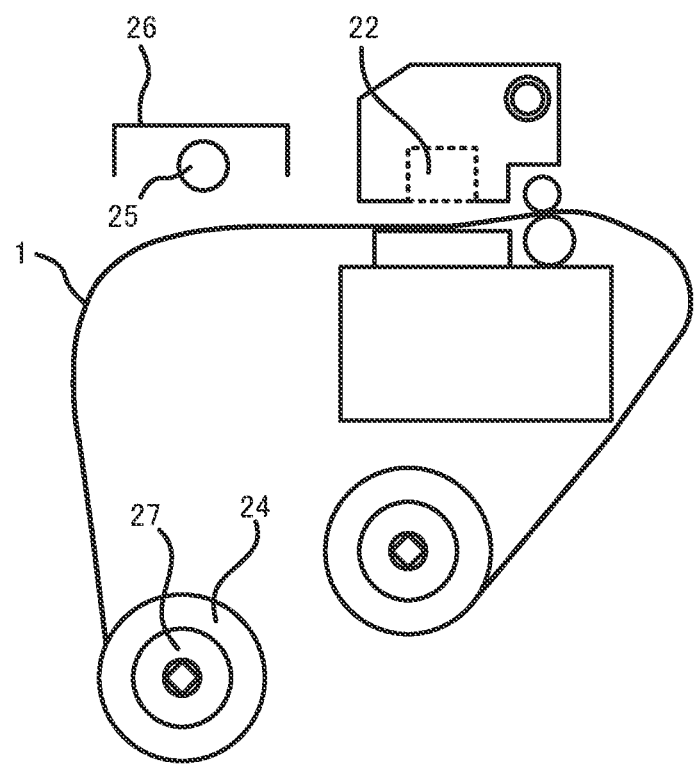
FIG. 2 is a side view for schematically illustrating the ink jet recording apparatus according to one embodiment of the present disclosure.

FIG. 1 is a perspective view for schematically illustrating an ink jet recording apparatus according to one embodiment of the present disclosure. In addition, FIG. 2 is a side view for schematically illustrating the ink jet recording apparatus according to one embodiment of the present disclosure. As illustrated in FIG. 1 and FIG. 2, the recording apparatus according to this embodiment includes a recording head 22 of an ink jet system configured to eject an ink. The recording head 22 is a recording head configured to eject an ink through action of thermal energy. The recording head configured to eject an ink through action of thermal energy is a recording head of a thermal system configured to eject an ink from an ejection orifice by applying an electric pulse to an electrothermal conversion element to apply thermal energy to the ink. The recording head of the thermal system has a mechanism by which the aqueous ink to be ejected from the recording head and applied to the recording medium is heated to the temperature $T_H$ (° C.) (temperature regulation mechanism). For the reason that the abrasion resistance of the image can be enhanced, the heating temperature $T_H$ (° C.) of the ink to be ejected from the recording head is preferably set to 40° C. or more. In addition, the heating temperature $T_H$ (° C.) of the ink to be ejected from the recording head is preferably set to 70° C. or less.

Heating Step

The recording method of the present disclosure includes the step of heating the recording medium having the ink applied thereto to the temperature $T_F$ (° C.) (heating treatment). When the recording medium having the ink applied thereto is heated, the formation of a film of the polyester resin particle is promoted, and hence an image excellent in abrasion resistance can be recorded.

A unit for the heating the recording medium is not particularly limited, and the heating may be performed by a heating unit exemplified by: a known heating unit such as a heater; an air blast unit utilizing an air blast such as a dryer; and a unit that is a combination thereof. That is, the ink jet recording apparatus includes a mechanism (heating unit) configured to heat the recording medium having the ink applied thereto to the temperature $T_F$ (° C.). Examples of the heating unit may include the above-mentioned heating unit, air blast unit and unit that is a combination thereof. As a method for the heating treatment, there may be given, for example, a method involving applying heat from the side (back surface) of the recording medium opposite to its recording surface (surface to which the ink is applied) with a heater or the like, a method involving applying warm air or hot air to the recording surface of the recording medium and a method involving performing heating from the recording surface or the back surface through use of an infrared heater. In addition, a plurality thereof may be combined. For the reason that the abrasion resistance of the image can be enhanced, the heating temperature (temperature of the image) $T_F$ (° C.) of the recording medium having the ink applied thereto is preferably set to 90° C. or less. In addition, the heating temperature (temperature of the image) $T_F$ (° C.) of the recording medium having the ink applied thereto is preferably 50° C. or more. For the reason that the abrasion resistance of the image can be further enhanced, it is preferred that the heating temperature $T_H$ (° C.) of the ink to be ejected from the recording head be set to 40° C. or more, and that the heating temperature (temperature of the image) $T_F$ (° C.) of the recording medium having the ink applied thereto be se to 90° C. or less. The heating temperature of the recording medium having the ink applied thereto may be read with a sensor incorporated at a position corresponding to the heating unit of the recording apparatus, or may be judged from a relationship between the heart quantity and the temperature of the recording medium determined in advance in accordance with the kinds of the ink and the recording medium.

The heat quantity ((W·h)/g) to be applied to the ink applied to the recording medium needs to be set to 2 (W·h)/g or more. When a heat quantity of 2 (W·h)/g or more is applied to the ink, the ink applied to the recording medium is sufficiently dried, and hence the abrasion resistance of the image to be recorded can be improved. The heat quantity ((W·h)/g) to be applied to the ink applied to the recording medium is preferably 10 (W·h)/g or less. The heat quantity to be applied to the ink may be measured as described below. First, power A (\V) to be applied to the heating unit configured to heat the recording medium is measured. In addition, a recording area B (m²/h) of the recording apparatus per unit time and an ink consumption amount C (g/m²) per unit area to be used for the recording are obtained. From those values, the heat quantity ((W·h)/g) applied to the ink applied to the recording medium is calculated based on the following equation (4).

$$\text{Heat quantity}((W \cdot h)/g) \text{ to be applied to ink applied to recording medium} = A(W)/B(m^2/h)/C(g/m^2) \tag{4}$$

In the recording apparatus illustrated in FIG. 1 and FIG. 2, a heater 25 supported by a frame (not shown) is arranged at a downstream position in a sub-scanning direction A with respect to a position at which the recording head 22 performs reciprocating scanning in a main scanning direction B. A recording medium 1 having the ink applied thereto can be heated by the heater 25. Specific examples of the heater 25 may include a sheath heater and a halogen heater. The heater 25 is covered by a heater cover 26. The heater cover 26 is a member configured to efficiently apply heat generated from the heater 25 to the recording medium 1. Further, the heater cover 26 is also a member configured to protect the heater 25. The recording medium 1 having applied thereto the ink ejected from the recording head 22 is wound around a winding spool 27 to form a roll-shaped wound medium 24.

Recording Medium

In each of the recording method and the recording apparatus of the present disclosure, a non-absorbent recording medium (low- to non-absorbent recording medium) is used as the recording medium. The low- to non-absorbent recording medium is a recording medium having a water absorption amount of 10 mL/m² or less from the start of contact to 30 msec$^{1/2}$ in a Bristow method described in "Test Method for Liquid Absorption Properties of Paper and Paperboard" in JAPAN TAPPI Paper Pulp Test Method No. 51. In the present disclosure, a recording medium satisfying the above-mentioned condition for the water absorption amount is defined as the "low- to non-absorbent recording medium." A recording medium for ink jet recording having a coating layer (ink-receiving layer) formed of an inorganic particle (e.g., glossy paper or matte paper) and plain paper having no coating layer are each an "absorbent recording medium", the above-mentioned water absorption amount of which is more than 10 mL/m$^2$.

As the low- to non-absorbent recording medium, there may be used: a plastic film; a recording medium in which a plastic film is bonded to the recording surface of a base material; a recording medium in which an organic resin coating layer is arranged on the recording surface of a base material containing cellulose pulp; or the like. Of those, a plastic film is preferred, and a recording medium in which an organic resin coating layer serving as an organic resin layer is arranged on the recording surface of a base material containing cellulose pulp is also preferred.

When the above-mentioned ink to be used in each of the recording method and the recording apparatus of the present disclosure is applied to the non-absorbent recording medium, components, such as water and a water-soluble organic solvent, are volatilized to concentrate the polyester resin particles. Consequently, fusion between the concentrated polyester resin particles is promoted, and hence the abrasion resistance of the image to be recorded is improved. On the other hand, when the above-mentioned ink is applied to a recording medium having a high property of absorbing a liquid component, the fusion between the polyester resin particles is not promoted easily, and hence the improving effect on the abrasion resistance of the image becomes insufficient. As used herein, the term "recording medium" refers not to a transfer member, but to a recording medium on which an image serving as a recorded product is to be recorded.

Aqueous Ink

The ink contains a pigment and a polyester resin particle. The constituent components of the ink and the like are described in detail below.

Coloring Material

The ink contains a pigment as a coloring material. The content (% by mass) of the pigment in the ink is preferably from 0.1% by mass or more to 15.0% by mass or less, more preferably from 1.0% by mass or more to 10.0% by mass or less with respect to the total mass of the ink.

Specific examples of the pigment may include: inorganic pigments, such as carbon black and titanium oxide and organic pigments, such as an azo pigment, phthalocyanine, quinacridone, isoindolinone, imidazolone, diketopyrrolopyrrole, dioxazine and perinone. Of the pigments, carbon black or an organic pigment is preferably used.

Examples of the dispersion mode of the pigment may include: a resin-dispersed pigment using a resin as a dispersant; and a self-dispersible pigment having a hydrophilic group bonded to the particle surface of the pigment. The examples may also include: a resin-bonded pigment obtained by chemically bonding an organic group containing a resin to the particle surface of a pigment; and a microcapsule pigment obtained by coating the particle surface of a pigment with a resin or the like.

As the resin dispersant for dispersing the pigment in an aqueous medium, one capable of dispersing the pigment in the aqueous medium through action of an anionic group is preferably used. A water-soluble resin is preferably used as the resin dispersant.

Examples of the resin dispersant may include an acrylic resin and a urethane-based resin. Of those, an acrylic resin is preferred, and an acrylic resin formed of a unit derived from (meth)acrylic acid or a (meth)acrylic acid ester is more preferred.

The acrylic resin preferably has a hydrophilic unit and a hydrophobic unit as constituent units. Of those, a resin having a hydrophilic unit derived from (meth)acrylic acid and a hydrophobic unit derived from at least one of a monomer having an aromatic ring or a (meth)acrylic acid ester is preferred. In particular, a resin having a hydrophilic unit derived from (meth)acrylic acid and a hydrophobic unit derived from at least one monomer out of styrene and α-methylstyrene is preferred. Each of those resins easily interacts with the pigment, and hence can be suitably utilized as the resin dispersant for dispersing the pigment.

The hydrophilic unit is a unit having a hydrophilic group such as an anionic group. The hydrophilic unit may be formed by, for example, polymerizing a hydrophilic monomer having a hydrophilic group. Specific examples of the hydrophilic monomer having a hydrophilic group may include acidic monomers each having a carboxylic acid group, such as (meth)acrylic acid, itaconic acid, maleic acid and fumaric acid and anionic monomers, such as anhydrides and salts of those acidic monomers. As a cation for forming the salt of the acidic monomer, there may be given, for example, lithium, sodium, potassium, ammonium and an organic ammonium ions. The hydrophobic unit is a unit free of a hydrophilic group such as an anionic group. The hydrophobic unit may be formed by, for example, polymerizing a hydrophobic monomer free of a hydrophilic group such as an anionic group. Specific examples of the hydrophobic monomer may include: monomers each having an aromatic ring, such as styrene, α-methylstyrene and benzyl (meth)acrylate and (meth)acrylic acid ester-based monomers, such as methyl (meth)acrylate, butyl (meth)acrylate and 2-ethylhexyl (meth)acrylate.

A product obtained by bonding an anionic group, such as a carboxylic acid group, a sulfonic acid group or a phosphonic acid group, to the particle surface of a pigment directly or through any other atomic group (—R—) may be used as the self-dispersible pigment. The anionic group may be in any one of an acid form and a salt form, and in the case of the salt form, may be in any one of a partially dissociated state and an entirely dissociated state. When the anionic group is in the salt form, as a cation serving as a counterion, there may be given, for example, an alkali metal cation, an ammonium and an organic ammonium. Specific examples of the other atomic group (—R—) may include: a linear or branched alkylene group having 1 to 12 carbon atoms; an arylene group, such as a phenylene group or a naphthylene group; a carbonyl group; an imino group; an amide group; a sulfonyl group; an ester group; and an ether group. In addition, the other atomic group (—R—) may be a group that is a combination of those groups.

Polyester Resin Particle

The ink contains a polyester resin particle. The content (% by mass) of the polyester resin particle in the ink is preferably from 0.1% by mass or more to 15.0% by mass or less, more preferably from 1.0% by mass or more to 10.0% by mass or less with respect to the total mass of the ink. The content (% by mass) of the polyester resin particle in the ink is preferably 1.5 times or more, more preferably 1.7 times or more, and is preferably 5.0 times or less in terms of mass ratio with respect to the content (% by mass) of the pigment. When the above-mentioned mass ratio is less than 1.5 times, the amount of the polyester resin particle is excessively small as compared to the pigment, and hence adhesiveness with the recording medium is hardly enhanced, and besides, the polyester resin particle fails to sufficiently cover the pigment, leading to a reduction in abrasion resistance of the image in some cases. The polyester resin particle is present in the ink in a dispersed state, that is, in the form of a resin emulsion. The polyester resin particle preferably contains no coloring material.

As used herein, the term "resin particle" refers to a resin that does not dissolve in the aqueous medium included in the ink, and specifically means a resin capable of being present in the aqueous medium in a state of forming a particle having a particle diameter measurable by a dynamic light scattering method. Meanwhile, the term "water-soluble resin" refers to a resin capable of dissolving in the aqueous medium included in the ink, and specifically means a resin capable of being present in the aqueous medium in a state of not forming a particle having a particle diameter measurable by the dynamic light scattering method. The "resin particle" may be reworded as "water-dispersible resin (water-insoluble resin)."

Whether or not a given resin is a "resin particle" may be judged in accordance with the following method. First, a liquid containing the resin to be judged (resin content: 10% by mass) is prepared. Next, the prepared liquid is diluted 10-fold (on a volume basis) with ion-exchanged water to prepare a sample. Then, in the case where the particle diameter of the resin in the sample is measured by the dynamic light scattering method, when a particle having a particle diameter is measured, the particle is judged to be a "resin particle" (water-dispersible resin). Meanwhile, when no particle having a particle diameter is measured, the resin is judged not to be a "resin particle" (but to be a "water-soluble resin"). Measurement conditions in this case may be set, for example, as follows: SetZero: 30 seconds, number of times of measurement: 3, measurement time: 180 seconds, shape: truly spherical shape, refractive index: 1.59. A particle size analyzer based on the dynamic light scattering method (e.g., product name: "Nanotrac UPA-EX150", manufactured by Nikkiso Co., Ltd.) or the like may be used as a particle size distribution-measuring apparatus. Of course, the particle size distribution-measuring apparatus, the measurement conditions and the like are not limited to the foregoing.

The polyester resin particle as well as other resins such as the resin dispersant is judged whether or not to be a resin particle in accordance with the above-mentioned method. However, in order to simply perform the judgment, for each of the other resins, it is preferred to use a liquid (resin content: 10% by mass) containing the resin neutralized with an alkali (e.g., sodium hydroxide or potassium hydroxide) equivalent to its acid value.

Constituent Materials for Polyester Resin

A polyester resin is generally formed of a unit derived from a polyhydric alcohol and a unit derived from a polyvalent carboxylic acid. An unreacted hydroxy group or carboxylic acid group is present at a terminal of the polyester resin. The total of the ratio (% by mass) of the unit derived from a polyhydric alcohol and the ratio (% by mass) of the unit derived from a polyvalent carboxylic acid in the polyester resin is preferably 90.0% by mass or more, more preferably 95.0% by mass or more, and may be 100.0% by mass.

(1) Polyhydric Alcohol

Examples of the polyhydric alcohol may include polyhydric alcohols that are dihydric to tetrahydric. Examples of the polyhydric alcohol may include a polyhydric alcohol having an aliphatic group, a polyhydric alcohol having an aromatic group and a sugar alcohol. Examples of the polyhydric alcohol may include: dihydric alcohols, such as ethylene glycol [1,2-ethanediol], neopentyl glycol [2,2-dimethyl-1,3-propanediol], 1,3-propanediol, 1,4-butanediol, benzenediol and 2,2-bis(4-hydroxyphenyl)propane [bisphenol A]; trihydric alcohols, such as glycerin, trimethylolethane and trimethylolpropane; and tetrahydric alcohols such as pentaerythritol. An oligomer (low-molecular-weight polymer having a molecular weight of 1,000 or less) may also be used as the polyhydric alcohol. A dihydric alcohol is preferably used as the polyhydric alcohol. The ratio (% by mass) of the unit derived from a polyhydric alcohol in the polyester resin is preferably from 40.0% by mass or more to 60.0% by mass or less.

(2) Polyvalent Carboxylic Acid

Examples of the polyvalent carboxylic acid may include polyvalent carboxylic acids that are divalent to tetravalent. Examples of the polyvalent carboxylic acid may include a polyvalent carboxylic acid having an aliphatic group, a polyvalent carboxylic acid having an aromatic group and a nitrogen-containing polyvalent carboxylic acid. Examples of the polyvalent carboxylic acid may include: divalent carboxylic acids, such as glutaric acid, adipic acid, terephthalic acid, isophthalic acid and 2,6-naphthalenedicarboxylic acid; trivalent carboxylic acids such as trimellitic acid; and tetravalent carboxylic acids such as ethylenediaminetetraacetic acid. An oligomer (low-molecular-weight polymer having a molecular weight of 1,000 or less) may also be used as the polyvalent carboxylic acid. A divalent carboxylic acid is preferably used as the polyvalent carboxylic acid. The ratio (% by mass) of the unit derived from a polyvalent carboxylic acid in the polyester resin is preferably from 40.0% by mass or more to 60.0% by mass or less.

Physical Properties of Polyester Resin Particle

The ratio (Mw/Mn) of the weight average molecular weight (Mw) of the polyester resin particle (polyester resin forming the polyester resin particle) to the number average molecular weight (Mn) thereof is 6.0 or less, preferably 5.0 or less, more preferably 4.0 or less. In addition, the ratio (Mw/Mn) of the weight average molecular weight (Mw) to the number average molecular weight (Mn) is preferably 1.5 or more, more preferably 2.0 or more. When the value of the Mw/Mn ratio is more than 6.0, the molecular weight distribution is so broad that the softening temperature of the resin particle does not fall within a desired range, and hence the ejection stability of the ink and the abrasion resistance of the image cannot both be achieved.

The weight average molecular weight of the polyester resin particle (polyester resin forming the polyester resin particle) is preferably from 30,000 or more to 70,000 or less. When the weight average molecular weight is less than 30,000, molecular chains of the polyester resin are so short as to be hardly entangled with each other, and hence the improving effect on the abrasion resistance of the image is reduced in some cases. Meanwhile, when the weight average molecular weight is more than 70,000, the molecular chains of the polyester resin are so long as to hardly generate molecular motion and hardly cause entanglement, and hence the improving effect on the abrasion resistance of the image is reduced in some cases. The number average molecular weight of the polyester resin particle (polyester resin forming the polyester resin particle) is preferably from 5,000 or more to 30,000 or less, Herein, the weight average molecular weight (Mw) and the number average molecular weight (Mn) are values in terms of polystyrene measured by gel permeation chromatography.

A glass transition temperature is an indicator of the ease with which a resin particle is melted, and means a temperature at which the resin particle starts to change from a crystalline state to an amorphous state. The glass transition temperature $T_G$ (° C.) of the polyester resin particle is preferably 50° C. or more, more preferably 60° C. or more, and is preferably 90° C. or less, more preferably 80° C. or less. The glass transition temperature of the polyester resin particle may be measured for the resin particle itself through use of a thermal analyzer such as a differential scanning calorimeter (DSC).

The glass transition temperature $T_G$ (° C.) of the polyester resin particle and the heating temperature $T_H$ (° C.) of the ink to be ejected from the recording head need to satisfy the relationship of the following expression (1), That is, it is important that the glass transition temperature $T_G$ (° C.) of the polyester resin particle be higher than the temperature $T_H$ (° C.). When the $T_G$ (° C.) is equal to or lower than the $T_H$ (° C.), part of the polyester resin particles are liable to fuse in the vicinity of the ejection orifice of the recording head, and hence the ejection stability of the ink becomes insufficient.

$$T_G(° C.) > T_H(° C.) \qquad (1)$$

The inventors observed a scraped portion of an image after the evaluation of its abrasion resistance with an electron microscope. As a result, the inventors found that, in the scraped portion, many pigment particles were present in a dotted manner as well as the fused polyester resin particles. Then, the inventors analyzed and compared the film physical properties of an image recorded with an ink containing no pigment and the film physical properties of an image recorded with an ink containing no polyester resin particle. As a result, the inventors found that the surface of the image recorded with the ink containing no polyester resin had a larger coefficient of friction.

When only the abrasion resistance is taken into consideration, it is conceived that an image surface is ideally formed of a resin film having a small coefficient of friction. In view of this, in order to allow the pigment to preferentially migrate to the inside of an ink dot applied to the non-absorbent recording medium, a further investigation was made with attention focused on the anionic group amounts (µmol/g) of the resin particle and the pigment. It is conceived that, in an ink dot adhering to the non-absorbent recording medium, water and a water-soluble organic solvent remain on the non-absorbent recording medium for some period of time. During that time, the liquid components are evaporated from the surface of the ink dot, resulting in a state in which the specific dielectric constants of the liquid components on the surface of the ink dot are lower than the specific dielectric constants of the liquid components on the inside of the ink dot. In this case, it is conceived that the pigment particle having a relatively large anionic group amount preferentially migrates to the inside of the ink dot.

As a result of the further investigation, it was revealed that, when the anionic group amount of the pigment was larger than the anionic group amount of the polyester resin particle to some degree, the abrasion resistance of the image was further improved. Specifically, it is preferred that the pigment be dispersed in the ink through action of an anionic group, and that the anionic group amount (µmol/g) of the pigment be 6.0 times or more in terms of ratio with respect to the anionic group amount (µmol/g) of the polyester resin particle. The anionic group amount (µmol/g) of the pigment is preferably 20.0 times or less, more preferably 10.0 times or less in terms of ratio with respect to the anionic group amount (µmol/g) of the polyester resin particle.

The anionic group of the pigment refers to, in the case of a self-dispersible pigment, an anionic group bonded to the particle surface of the pigment directly or through any other atomic group, and in the case of a pigment dispersed with a dispersant such as a resin dispersant, an anionic group of the dispersant. The anionic group amount (µmol/g) of the pigment is, in the case of a self-dispersible pigment, the anionic group amount per unit mass of the self-dispersible pigment itself, and in the case of a pigment dispersed with a dispersant, the anionic group amount per unit mass of the total of the pigment and the dispersant. The anionic group amounts of the resin particle and the pigment may both be measured by colloid titration. In Examples to be described later, the anionic group amounts of resin particles and pigments were measured by colloid titration utilizing a potential difference through use of a potentiometric automatic titrator (product name: "AT-510", manufactured by Kyoto Electronics Manufacturing Co., Ltd.) mounted with a flow potentiometric titration unit (PCD-500). Methylglycol chitosan was used as a titrant.

Analysis of Polyester Resin Particle

The composition of the polyester resin forming the resin particle may be analyzed by, for example, the following method. First, the resin particle is dissolved in an organic solvent such as tetrahydrofuran capable of dissolving the resin particle to prepare a sample. The resin particle to be dissolved in the organic solvent may be in the state of an aqueous dispersion liquid, or may be in a dry state. The kinds and ratios of the constituent units (monomers) of the resin may be found out by analyzing the prepared sample by analysis methods, such as nuclear magnetic resonance (NMR) spectroscopy and matrix-assisted laser desorption ionization mass spectrometry (MALDI-MS). In addition, the constituent units (monomers) of the resin may be detected by analyzing the resin particle through pyrolysis gas chromatography. When insoluble matter that does not dissolve in the organic solvent is generated during the preparation of the sample, the constituent units (monomers) of the resin may be detected by analyzing the generated insoluble matter through pyrolysis gas chromatography.

Wax Particle

The ink preferably further contains a wax particle. An image recorded using the ink containing the wax particle is reduced in coefficient of dynamic friction of its surface and can allow a stress applied by an abrasion to escape, and hence has more satisfactory abrasion resistance. The melting point of a wax for forming the wax particle is preferably higher than the heating temperature $T_F$ (° C.) of the recording medium having the ink applied thereto. When the melting point of the wax is equal to or lower than the heating temperature $T_F$ (° C.), the wax is melted by heating to become less likely to be present in the vicinity of the surface of the image, and hence the improving effect on the abrasion resistance of the image is weakened in some cases. The melting point of the wax may be measured in conformity with a test method described in 5.3.1 (Melting Point Test Method) of JIS K2235:1991 (Petroleum waxes).

An example of the wax for forming the wax particle may be a synthetic wax. Examples of the synthetic wax may include at least one kind of wax selected from the group consisting of: a Fischer-Tropsch wax; a polyolefin wax; an α-olefin/maleic anhydride copolymer; and the like. Those synthetic waxes tend to have narrow molecular weight distributions as compared to natural waxes, such as a paraffin wax and a carnauba wax. Accordingly, the synthetic wax easily allows the melting point of the wax to be accurately controlled so as to prevent the melting of the wax particle with respect to the heating temperature $T_F$ (° C.) of the recording medium having the ink applied thereto, and hence can be suitably used.

The content (% by mass) of the wax particle in the ink is preferably from 0.1% by mass or more to 5.0% by mass or less with respect to the total mass of the ink. In addition, the content (% by mass) of the polyester resin particle in the ink is preferably from 2.0 times or more to 30.0 times or less in terms of mass ratio with respect to the content (% by mass) of the wax particle. When the above-mentioned mass ratio is less than 2.0 times, the wax particle is liable to inhibit the formation of a film of the polyester particle to slightly weaken the strength of an ink film, and hence the improving effect on the abrasion resistance of the image is weakened in some cases. Meanwhile, when the above-mentioned mass ratio is more than 30.0 times, the amount of the wax particle is so small with respect to the polyester resin particle that the amount of the wax particle present on the surface of the image is reduced, and hence the improving effect on the abrasion resistance of the image is weakened in some cases.

Aqueous Medium

The ink is an aqueous ink containing at least water as an aqueous medium. Water or an aqueous medium that is a mixed solvent of water and a water-soluble organic solvent may be incorporated into the ink. Deionized water or ion-exchanged water is preferably used as the water. The content (% by mass) of the water in the ink is preferably from 50.0% by mass or more to 95.0% by mass or less with respect to the total mass of the ink. In addition, the content (% by mass) of the water-soluble organic solvent in the ink is preferably from 3.0% by mass or more to 50.0% by mass or less, more preferably from 5.0% by mass or more to 30.0% by mass or less with respect to the total mass of the ink. Any one of solvents that may be used in inks for ink jet, such as alcohols, (poly)alkylene glycols, glycol ethers, nitrogen-containing compounds and sulfur-containing compounds, may be used as the water-soluble organic solvent. The term "water-soluble organic solvent" generally refers to a liquid, but in the present disclosure, the water-soluble organic solvent also encompasses a water-soluble organic solvent that is solid at a temperature of 25° C.

The water-soluble organic solvent influences the drying properly of the ink and the glass transition temperature $T_G$ (° C.) of the polyester resin particle. The inventors made an investigation regarding the optimum water-soluble organic solvent in order to achieve both of the ejection stability of the ink and the abrasion resistance of the image at higher levels. As a result, the inventors found that, when the boiling point of the water-soluble organic solvent was excessively low, the ejection stability of the ink tended to be reduced. For example, when the boiling point of the water-soluble organic solvent was 120° C. or less, in the case where the ink was ejected from the recording head subjected to temperature regulation to record an image for a long period of time, non-ejection occurred at some of the ejection ports. It is conceived that, when the boiling point of the water-soluble organic solvent is excessively low, the moisture-retaining property of the ink is not easily secured in the vicinity of the ejection orifices of the recording head subjected to temperature regulation, and hence the resin in the ink is liable to stick.

Meanwhile, it was found that, when the boiling point of the water-soluble organic solvent was excessively high, the abrasion resistance of the image to be recorded tended to be reduced. For example, when the boiling point of the water-soluble organic solvent was 310° C. or more, the abrasion resistance of the image was reduced in some cases. It is conceived that, even if heating had been performed for a long period of time at the upper limit temperature (about 90° C.) at which thermal shrinkage of the vinyl chloride sheet is suppressed, part of the water-soluble organic solvent having a high boiling point would have remained in the image to reduce the abrasion resistance of the image.

Further, it was revealed that, when a water-soluble organic solvent having an SP value close to the SP value of the polyester resin particle was used, the glass transition temperature $T_G$ (° C.) of the polyester resin particle tended to be reduced easily. Specifically, when a difference between the SP value of the water-soluble organic solvent and the SP value of the polyester resin particle (hereinafter sometimes referred to as "ΔSP value") is 4.0 or less, the glass transition temperature $T_G$ (° C.) of the polyester resin particle is greatly reduced.

First Water-Soluble Organic Solvent

The ink preferably contains a first water-soluble organic solvent having a boiling point of from 120° C. or more to 220° C. or less. In addition, the first water-soluble organic solvent preferably has the largest content (% by mass) among all water-soluble organic solvents in the ink. When the ink applied to the non-absorbent recording medium is heated, the liquid components in the ink are evaporated, and hence the polyester resin and the water-soluble organic solvent are concentrated in the ink dot. At this time, the glass transition temperature $T_G$ (° C.) of the polyester resin particle brought into contact with the water-soluble organic solvent having a similar SP value is greatly reduced to promote fusion between the polyester resin particles. When the boding point of the first water-soluble organic solvent is 220° C. or less, the first water-soluble organic solvent is easily volatilized from the resin film formed through the fusion, and hence the abrasion resistance of the image is conceived to be more improved. Meanwhile, when the boiling point of the water-soluble organic solvent is less than 120° C., the moisture-retaining property of the ink is liable to be reduced, and hence the ejection stability is slightly reduced in some cases.

Examples of the first water-soluble organic solvent having a boiling point of from 120° C. or more to 220° C. or less may include 1,3-propanediol (214° C.), 2-methyl-1,3-propanediol (214° C.), diethylene glycol monoethyl ether (202° C.), ethylene glycol (198° C.), diethylene glycol monomethyl ether (194° C.), 1,2-butanediol (193° C.), propylene glycol (188° C.), 3-methoxy-3-methylbutanol (174° C.), diethylene glycol dimethyl ether (160° C.). 2-ethoxyethanol (136° C.). 2-methoxyethanol (125° C.) and propylene glycol monomethyl ether (120° C.).

From the viewpoint of further improving the abrasion resistance of the image to be recorded, a difference (ΔSP value) between the SP value of the first water-soluble organic solvent and the SP value of the polyester resin particle is preferably 4.0 or less, more preferably 3.5 or less. The ΔSP value is preferably 0.1 or more, more preferably 0.5 or more. In addition, the content (% by mass) of the first water-soluble organic solvent in the ink is preferably from 1.0 times or more to 4.0 times or less in terms of mass ratio with respect to the content (% by mass) of the polyester resin particle. When the above-mentioned mass ratio is less than 1.0 times, it becomes slightly difficult to sufficiently reduce the glass transition temperature $T_G$ (° C.) of the polyester resin particle, and hence the improving effect on the abrasion resistance of the image is reduced in some cases. Meanwhile, when the above-mentioned mass ratio is more than 4.0 times, part of the polyester resin particles reduced in glass transition temperature $T_G$ (° C.) become liable to melt, and hence the improving effect on the ejection stability of the ink is reduced in some cases.

When a plurality of kinds of water-soluble organic solvents each falling within the category of the first water-soluble organic solvent are used, it is appropriate that the "SP value" of the first water-soluble organic solvent be grasped as the concept of "average SP value". The "average SP value" is a value obtained as follows: a value obtained by multiplying the SP value of one water-soluble organic solvent by the ratio (% by mass) of the water-soluble organic solvent in the total amount of water-soluble organic solvents in the ink is calculated for each of the water-soluble organic solvents, and the calculated values are added up. For example, the average SP value of water-soluble organic solvents of the following composition (15.0 parts by mass in total) is "(12.8×10.0/15.0)+(13.5×5.0/15.0)=12.8", Numerical values in parentheses are the SP values (the unit is omitted) of the respective water-soluble organic solvents.

1,2-Butanediol (12.8): 10.0 parts by mass
1,2-Propanediol (13.5): 5.0 parts by mass Second Water-soluble Organic Solvent Detailed analysis of an image recorded with an ink containing only the first water-soluble organic solvent as its water-soluble organic solvent found that there was a portion in which the polyester resin particle had not sufficiently fused. This is conceivably because the first water-soluble organic solvent was volatilized before sufficiently blending with the polyester resin particle in the ink applied to the non-absorbent recording medium, and hence it was difficult to sufficiently reduce the glass transition temperature $T_G$ (° C.) of the polyester resin particle. In view of this, the inventors found that the use of a water-soluble organic solvent having a higher boiling point than the first water-soluble organic solvent further improved the abrasion resistance of the image to be obtained. That is, the ink preferably contains a second water-soluble organic solvent having a boiling point of from more than 220° C. to 310° C. or less. In addition, a difference (ΔSP value) between the SP value of the second water-soluble organic solvent and the SP value of the polyester resin particle is preferably 4.0 or less, more preferably 3.5 or less. The ΔSP value is preferably 0.1 or more, more preferably 0.5 or more. When a plurality kinds of water-soluble organic solvents each falling within the category of the second water-soluble organic solvent are used, it is appropriate that the "SP value" of the second water-soluble organic solvent be grasped as the concept of "average SP value" as with the case of the first water-soluble organic solvent.

Examples of the second water-soluble organic solvent having a boiling point of from more than 220° C. to 310° C. or less may include 2-hydroxyethyl-2-pyrrolidone (309° C.), trimethylolpropane (296° C.), glycerin (290° C.), triethylene glycol (288° C.), sulfolane (287° C.), diethylene glycol (246° C.), 2-pyrrolidone (245° C.), dipropylene glycol (232° C.), diethylene glycol mono-2-ethylhexyl ether (229° C.) and 1,2-hexanediol (223° C.).

SP Value of Water-soluble Organic Solvent

An SP value (δ) in the present disclosure is a value [unit: $(cal/cm^3)^{1/2}$] calculated by Fedors' method based on the following equation (1). $\Delta E_{vap}$ and V of a resin may be determined, for example, with reference to the description of Coating Jiho, No. 193 (1992) or the like.

$$\delta = \sqrt{\frac{\Delta E_{vap}}{V}} \qquad \text{Equation (1)}$$

In the equation (1), $\Delta E_{vap}$ represents the molar heat of vaporization (cal/mol) of a compound, and V represents the molar volume (cc/mol) of the compound at 25° C.

The SP values of water-soluble organic solvents widely used in aqueous inks for ink jet according to Fedors' method are shown below with the omission of the unit $(cal/cm^3)^{1/2}$. Glycerin (16.4), 1-hydroxy-2-pyrrolidone (16.4), 1,3-propanediol (16.1), trimethylolpropane (15.9), 1,4-butanediol (15.0), diethylene glycol (15.0), ethylene glycol (14.8), 1,3-butanediol (14.8), 2-methyl-1,3-propanediol (14.8), 1,2,6-hexanetriol (14.5), urea (14.4), ethylene urea (14.2), 1,5-pentanediol (14.2). 1-(hydroxymethyl)-2-pyrrolidone (14.2), 1,2,7-heptanetriol (13.9), methanol (13.8), triethanolamine (13.7), triethylene glycol (13.6), 1,6-hexanediol (13.5), 1-(2-hydroxyethyl)-2-pyrrolidone (13.5), 3-methyl-1,5-pentanediol (13.4), 2-ethylpropane-1,3-diol (13.2), 2-methylpentane-2,4-diol (13.1), tetramethylene sulfoxide (12.9), 1-(3-hydroxypropyl)-2-pyrrolidone (12.9), tetraethylene glycol (12.8), polyethylene glycol having a number average molecular weight of 200 (12.8), 1,2-butanediol (12.8), 2-pyrrolidone (12.6), 1-(4-hydroxybutyl)-2-pyrrolidone (12.5), 1,2-pentanediol (12.2), 3-methylsulfolane (12.1), ethylene glycol monomethyl ether (12.0), n-propanol (11.8), 1,2-hexanediol (11.8), isopropanol (11.6), N-methyl-2-pyrrolidone (11.5), ethylene glycol monoethyl ether (11.5), 1,3-di methyl-2-imidazolidinone (11.4), n-butanol (11.3), diethylene glycol monomethyl ether (11.2), 2-butanol (11.1), isobutanol (11.1), diethylene glycol monoethyl ether (10.9), triethylene glycol monoethyl ether (10.6), polyethylene glycol having a number average molecular weight of 600 (10.5), diethylene glycol monobutyl ether (10.5), 3-methoxy-3-methylbutanol (10.5), triethylene glycol monobutyl ether (10.3), tetraethylene glycol monobutyl ether (10.2), polyethylene glycol having a number average molecular weight of 1,000 (10.1), γ-butyrolactone (9.9), 3-methoxy-N,N-dimethylpropionamide (9.2), tetraethylene glycol dimethyl ether (8.5), triethylene glycol butyl methyl ether (8.4) and ethylene glycol dimethyl ether (7.6). The SP value of the water-soluble organic solvent to be incorporated into the ink is preferably from 5.0 $(cal/cm^3)^{1/2}$ or more to 20.0 $(cal/cm^3)^{1/2}$ or less.

Other Components

The ink may contain various additives, such as a surfactant, a pH adjuster, an antifoaming agent, a rust inhibitor, a preservative, a fungicide, an antioxidant, a reduction inhibitor and a chelating agent, as required. Those components (other components) are different from the water-soluble organic solvents, and hence their boiling points and SP values do not need to be taken into consideration. When a surfactant is incorporated, the content (% by mass) of the surfactant in the ink is preferably from 0.1% by mass or more to 5.0% by mass or less, more preferably from 0.1% by mass or more to 2.0% by mass or less with respect to the total mass of the ink.

EXAMPLES

The present disclosure is described in more detail below by way of Examples and Comparative Examples. The present disclosure is by no means limited to Examples below without departing from the gist of the present disclosure, "Part(s)" and "%" with regard to the description of the amounts of components are by mass unless otherwise stated.

Measurement Methods for Physical Property Values

Weight Average Molecular Weight and Number Average Molecular Weight of Resin

The weight average molecular weight (Mw) and number average molecular weight (Mn) of a resin (particle) were measured in accordance with the following procedure. The resin was added to tetrahydrofuran and dissolved therein at 25° C., over 24 hours, followed by filtration through a membrane filter to prepare a sample. The content of the resin in the sample was adjusted to about 0.3%. The prepared sample was analyzed by gel permeation chromatography in accordance with conditions described below, and the number average molecular weight was calculated using a molecular weight calibration curve prepared using standard polystyrene resins. Products available under the product names "TSK Standard Polystyrene F-850, F-450, F-288, F-128, F-80, F-40, F-20, F-10, F-4, F-2, F-1, A-5000, A-2500, A-1000 and A-500" (manufactured by Tosoh Corporation) were used as the standard polystyrene resins.
HPLC apparatus: product name "2695 Separations Module" (manufactured by Waters Corporation)
Differential refractive index (RD detector: product name "2414 Detector" (manufactured by Waters Corporation)
Column: four columns of product name "GPC KF-806M" (manufactured by Showa Denko K.K.) connected in series
Eluent: tetrahydrofuran
Flow rate: 1.0 mL/min
Oven temperature: 40° C.
Sample injection amount: 100 μL Glass Transition Temperature of Resin A liquid containing a resin particle was brought to dryness at 60° C., and 2 mg of the resultant resin particle was placed and sealed in an aluminum container to prepare a sample for measurement. The prepared sample was subjected to thermal analysis using a differential scanning calorimeter (product name: "Q1000", manufactured by TA Instruments) in accordance with a temperature program shown below to prepare a temperature increase curve. The temperature in the prepared temperature increase curve (horizontal axis: temperature, vertical axis: heat quantity) al the point of intersection of a straight line passing through two points in the curve on a low temperature side and extending to a high temperature side and a tangent line drawn at the point at which the gradient of a stepwise change portion in the curve became maximum was defined as the "glass transition temperature (Tc) of the resin (particle)."

Temperature Program (1) temperature increase to 200° C., at 10° C./min
(2) temperature decrease from 200° C. to −50° C. at 5° C./min
(3) temperature increase from −50° C. to 200° C. at 10° C./min Judgment of Whether or Not Resin is Resin Particle, Particle Diameter A liquid containing a resin was diluted with ion-exchanged water to prepare a sample having a resin content of about 1.0%. The sample was measured for the particle diameter (volume-based 50% cumulative particle diameter $D_{50}$) of a resin particle through use of a particle size distribution meter based on a dynamic light scattering method in accordance with measurement conditions described below A product available under the product name "Nanotrac WAVE II-Q" (manufactured by MicrotracBEL Corp.) was used as the particle size distribution meter. When a particle having a particle diameter was measured by this measurement method, the resin was judged to be a "resin particle" (to be a "water-dispersible resin"). Meanwhile, when no particle having a particle diameter was measured by this measurement method, the resin was judged not to be a "resin particle" (but to be a "water-soluble resin").

Measurement Conditions

SetZero: 30 s
Number of times of measurement: 3
Measurement time: 180 seconds
Shape: truly spherical shape
Refractive index: 1.6
Density: 1.0

Preparation of Pigment Dispersion Liquids (Pigment Dispersion Liquids 1 to 3)

A styrene/acrylic acid copolymer (composition (molar) ratio=84.6/15.4) serving as a water-soluble resin was dissolved in ion-exchanged water with the addition of sodium hydroxide whose molar amount was equivalent to the acid value to prepare an aqueous solution of a resin dispersant having a resin content of 25.0%, The acid value of the water-soluble resin is 120 mgKOH/g. A mixture of respective components of kinds and amounts (unit: %) shown in Table 1 was placed in a sand grinder and subjected to dispersion treatment for 1 hour. After that, centrifugation treatment was performed to remove a coarse particle, pressure filtration was performed through a microfilter having a pore size of 3.0 µm (manufactured by FUJIFILM Corporation), and an appropriate amount of ion-exchanged water was added to provide each pigment dispersion liquid. The anionic group amount of the pigment is shown in Table 1.

TABLE 1

Compositions and Characteristics of Pigment Dispersion Liquids

|  | Pigment dispersion liquid | | |
|---|---|---|---|
|  | 1 | 2 | 3 |
| Carbon black | 30.0 | 30.0 | 30.0 |
| Aqueous solution of resin dispersant | 30.0 | 18.0 | 24.0 |
| Ion-exchanged water | 40.0 | 46.0 | 52.0 |
| Content (%) of pigment | 30.0 | 30.0 | 30.0 |
| Content (%) of resin dispersant | 7.5 | 4.5 | 6.0 |
| Anionic group amount (µmol/g) | 536 | 322 | 429 |

Pigment Dispersion Liquid 4

With reference to the description of "Preparation of Black Pigment Dispersion Liquid 1" in Japanese Patent Application Laid-Open No. 2012-251049, a pigment (C.I. Pigment Black 7) dispersion liquid 4 using a water-insoluble resin as a resin dispersant was obtained. The water-insoluble resin used as the resin dispersant is a methacrylic acid/styrene macromer/2-ethylhexyl methacrylate/styrene/methoxypolyethylene glycol monomethacrylate copolymer. The content of the pigment in the resultant pigment dispersion liquid was 30.0%, the content of the resin was 6.0%, and the anionic group amount of the pigment was 398 µmol/g.

Preparation of Aqueous Dispersion Liquids of Resin Particles

Resin Particles 1 to 8

A reaction vessel having a stirring device placed in an autoclave was loaded with a mixture of monomers of kinds and usage amounts (parts) shown in Table 2. The contents were increased in temperature to 220° C. and subjected to an esterification reaction in accordance with a "stirring speed" and a "reaction time" shown in Table 2. The temperature was increased to 240° C., and the pressure in the autoclave was reduced to 13 Pa over 90 minutes. The decompressed state of 240° C. and 13 Pa was kept for 5 hours to continue the esterification (dehydration condensation) reaction, and then a nitrogen gas was introduced into the autoclave to return the pressure to normal pressure. After the temperature in the reaction vessel had been lowered to 220° C., a catalyst (tetra-n-butyl titanate) and 1.0 part of trimellitic acid were added, and the mixture was heated at 220° C. for 2 hours to be subjected to a transesterification reaction. The amount (mol) of the catalyst was set to "$3\times10^{-4}\times$total use amount of polyvalent carboxylic acid (mol)." After that, a nitrogen gas was introduced into the autoclave to establish a pressurized state, and a sheet-shaped resin was taken out. The resin taken out was cooled to 25° C. and then pulverized with a crusher to provide a polyester resin. The meanings of abbreviations for monomers in Table 2 are shown below EG: ethylene glycol
NPG: neopentyl glycol
tPA: terephthalic acid
iPA: isophthalic acid A stirrer (product name: "TORNADO STIRRER STANDARD SM-104", manufactured by AS ONE Corporation) was set in a beaker having a volume of 2 L. The beaker was loaded with 200 g of the polyester resin and methyl ethyl ketone (MEK), and the contents were stirred at 30° C. to dissolve the polyester resin. Then, 15.9 g of a 5% aqueous solution of potassium hydroxide was added, and the mixture was stirred for 30 minutes. While the mixture was stirred at 30° C., 500 g of deionized water was added dropwise at a rate of 20 mL/min. The temperature was increased to 60° C., and then MEK and part of water were removed by evaporation. After cooling to 25° C., the resultant was filtered through a 150-mesh wire mesh, and deionized water was added to provide aqueous dispersion liquids of resin particles 1 to 8 (resin content: 30.0%). The characteristics of the resin particles in the resultant aqueous dispersion liquids are shown in Table 2.

Resin Particle 9

An aqueous dispersion liquid of a commercially available polyester resin particle (product name: "Elitel KT-8803" manufactured by Unitika Ltd., resin content: 30.0%) was used as an "aqueous dispersion liquid of a resin particle 9." The resin particle 9 had an anionic group amount of 398 µmol/g, a number average molecular weight of 15,000, a glass transition temperature $T_G$ of 65° C. and an SP value of 11.9.

TABLE 2

Synthesis Conditions and Characteristics of Resin Particles 1 to 8

|  | Synthesis conditions | | | | | | Characteristics | | | | | |
|---|---|---|---|---|---|---|---|---|---|---|---|---|
|  | Usage amount (pasts) of monomer | | | | Stirring speed | Reaction time | Anionic group amount | Weight average molecular weight Mw | Number average molecular weight Mn |  | Glass transition temperature | SP |
| Resin particle | EG | NPG | tPA | iPA | (rpm) | (h) | (µmol/g) |  |  | Mw/Mn | $T_G$ (° C.) | value |
| 1 | 17.7 | 19.8 | 43.1 | 43.1 | 100 | 4.0 | 71 | 59,000 | 19,567 | 3.0 | 74 | 11.9 |
| 2 | 17.7 | 19.8 | 43.1 | 43.1 | 50 | 4.0 | 71 | 59,000 | 9,833 | 6.0 | 74 | 11.9 |
| 3 |  | 49.5 | 43.1 | 43.1 | 100 | 3.0 | 71 | 59,000 | 19,567 | 3.0 | 59 | 11.3 |
| 4 | 17.7 | 19.8 | 43.1 | 43.1 | 100 | 1.5 | 71 | 27,000 | 9,000 | 3.0 | 74 | 11.9 |
| 5 | 17.7 | 19.8 | 43.1 | 43.1 | 100 | 2.0 | 71 | 30,000 | 10,000 | 3.0 | 74 | 11.9 |

TABLE 2-continued

Synthesis Conditions and Characteristics of Resin Particles 1 to 8

| Resin particle | Synthesis conditions | | | | | | Characteristics | | | | | |
|---|---|---|---|---|---|---|---|---|---|---|---|---|
| | Usage amount (pasts) of monomer | | | | Stirring speed | Reaction time | Anionic group amount | Weight average molecular | Number average molecular | | Glass transition temperature | SP |
| | EG | NPG | tPA | iPA | (rpm) | (h) | (μmol/g) | weight Mw | weight Mn | Mw/Mn | $T_G$ (° C.) | value |
| 6 | 17.7 | 19.8 | 43.1 | 43.1 | 100 | 6.0 | 71 | 70,000 | 23,000 | 3.0 | 74 | 11.9 |
| 7 | 17.7 | 19.8 | 43.1 | 43.1 | 100 | 6.5 | 71 | 72,000 | 24,000 | 3.0 | 74 | 11.9 |
| 8 | 17.7 | 19.8 | 43.1 | 43.1 | 10 | 4.0 | 71 | 59,000 | 8,429 | 7.0 | 74 | 11.9 |

Resin Particles 10 to 12

1,160 mL of water was heated to 90° C. in a reaction vessel. In addition, 160 of water was mixed with 1.39 g of potassium persulfate as a polymerization initiator to prepare an initiator solution. 32 mL of the prepared initiator solution was added to the reaction vessel, and the contents were stirred. Separately, 159.4 mL of water was mixed with monomers of kinds and usage amounts (g) shown in Table 3, 1.6 g of isooctyl thioglycolate serving as a chain transfer agent and 9.98 g of a 30% aqueous solution of an emulsifier to prepare a monomer mixed liquid. A product available under the product name "Rhodafac RS 710" (manufactured by Rhodia Novecare) was used as the emulsifier. The prepared monomer mixed liquid was added dropwise into the reaction vessel over 30 minutes, and at the same time. 129.4 g of the initiator solution was added dropwise into the reaction vessel over 30 minutes, and the mixture was stirred. The resultant reaction product was stirred and maintained at 90° C. for 3 hours. After cooling to 50° C., the pH of the resultant was adjusted to 8.5 by adding a 50% aqueous solution of potassium hydroxide. After the contents had been cooled to ambient temperature, the resultant was filtered through a 200-mesh filter, and deionized water was added to provide dispersion liquids of resin particles 10 to 12 (resin content: 30.0%). The characteristics of the resin particles in the resultant dispersion liquids are shown in Table 3. The meanings of abbreviations for monomers in Table 3 are shown below
St: styrene
HMA: hexyl methacrylate
EGDMA: ethylene glycol dimethacrylate
αMSt: α-methylstyrene
BzA: benzyl acrylate
MAA: methacrylic acid.

Preparation of Wax Particles

The content of each of the following commercially available wax particles was adjusted with deionized water to prepare an aqueous dispersion liquid of the wax particle (content of wax particle: 30.0%).
Aqueous Dispersion Liquid of Wax Particle 1
Fischer-Tropsch wax (product name: "EMUSTAR-6315", manufactured by Nippon Seiro Co., Ltd., melting point: 113° C.)
Aqueous Dispersion Liquid of Wax Particle 2
Carnauba wax (product name: "Selosol 524", manufactured by Chukyo Yushi Co., Ltd., melting point: 83° C.)
Aqueous Dispersion Liquid of Wax Particle 3
Oxidized polyethylene wax (product name: "AQUACER 515", manufactured by BYK Japan KK., melting point: 135° C.)

Preparation of Inks

Respective components (unit:%) shown in Table 4 were mixed and thoroughly stirred, followed by pressure filtration through a membrane filter having a pore size of 4.5 μm (product name: "HDC II Filter", manufactured by Pall) to prepare each ink. The characteristics of each prepared ink are shown in the lower rows of Table 4. In addition, details about the components in Table 4 are described below. In Table 4, numerical values in parentheses accompanying a water-soluble organic solvent are the boiling point (° C.) and SP value of the water-soluble organic solvent. "SP value $V_2$ of second water-soluble organic solvent" in the case of containing a plurality of second water-soluble organic solvents is a value weighted with the mass ratio of their contents,

TABLE 3

Synthesis Conditions and Characteristics of Resin Particles 10 to 12

| Resin particle | Synthesis conditions: Usage amount (g) of monomer | | | | | | Characteristics | | | | | |
|---|---|---|---|---|---|---|---|---|---|---|---|---|
| | | | | | | | Anionic group amount | Weight average molecular weight | Number average molecular weight | | Glass transition temperature | SP |
| | St | HMA | EGDMA | αMSt | BzA | MAA | (μmol/g) | Mw | Mn | Mw/Mn | Tg (° C.) | value |
| 10 | 80.0 | 292.0 | 4.0 | | | 24.0 | 650 | 59,000 | 8,000 | 7.4 | 39 | 9.9 |
| 11 | 183.0 | | | | 80.0 | 1.5 | 71 | 59,000 | 8,000 | 7.4 | 67 | 10.8 |
| 12 | | | | 183.0 | 80.0 | 1.5 | 71 | 59,000 | 8,000 | 7.4 | 105 | 10.4 |

Zonyl FS-31.00: product name, fluorine-based surfactant, manufactured by Chemours BYK-333: product name, silicone-based surfactant, manufactured by BYK Japan KK BYK-349: product name, silicone-based surfactant, manufactured by BYK Japan KK SURFYNOL DF-110D: product name, acetylenediol-based surfactant, manufactured by Nissin Chemical Co., Ltd.

TABLE 4

Compositions and Characteristics of Inks

| | Ink | | | | | | | | | | | | | | | | | | | | |
|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 |
| Kind of pigment dispersion liquid | 1 | 1 | 1 | 1 | 1 | 1 | 1 | 1 | 1 | 1 | 1 | 1 | 1 | 1 | 1 | 1 | 1 | 1 | 2 | 3 | 1 |
| Kind of resin particle | 2 | 2 | 1 | 1 | 1 | 1 | 3 | 1 | 1 | 1 | 1 | 1 | 1 | 1 | 1 | 1 | 1 | 1 | 1 | 1 | 4 |
| Kind of wax particle | — | — | — | — | — | — | — | — | — | — | — | — | — | — | — | — | — | — | — | — | — |
| Pigment dispersion liquid | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |
| Liquid containing resin particle | 30.0 | 30.0 | 30.0 | 30.0 | 30.0 | 30.0 | 30.0 | 30.0 | 30.0 | 30.0 | 30.0 | 30.0 | 30.0 | 30.0 | 30.0 | 30.0 | 30.0 | 30.0 | 30.0 | 30.0 | 30.0 |
| Aqueous dispersion liquid of wax particle | | | | | | | | | | | | | | | | | | | | | |
| Tetraethylene glycol (327° C., 12.8) | | | | | | | | | | | | | | | | 5.0 | | | | | |
| 2-Hydroxyethyl-2-pyrrolidone (309° C., 13.5) | | | | | | | | | | | | | | | 5.0 | | | | | | |
| Trimethylol propane (296° C., 15.9) | | | | | | | | | | | | | | | | | 5.0 | | | | |
| Glycerin (290° C., 16.4) | | | | | | | | | | | | | | | | | | 5.0 | | | |
| Diethylene glycol (246° C., 15.0) | | | | | | | | | | | | | | | | | | | | | |
| 2-Pyrrolidone (245° C., 12.6) | 5.0 | 5.0 | 5.0 | 5.0 | 5.0 | 5.0 | 5.0 | 5.0 | 5.0 | 5.0 | 5.0 | 5.0 | | | | | | | 5.0 | 5.0 | 5.0 |
| Dipropylene glycol (245° C., 13.6) | | | | | | | | | | | 5.0 | 5.0 | | | | | | | 5.0 | 5.0 | 5.0 |

TABLE 4-continued

Compositions and Characteristics of Inks

| Component (BP, HSP) | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| Diethylene glycol mono-2-ethylhexyl ether (229° C., 9.9) | 15.0 | | | | | | | | | | | | | | | | |
| 1,2-Hexanediol (223° C., 11.8) | | 15.0 | | | | | | | | | | | | | | | |
| 1,3-Propanediol (214° C., 16.1) | | | 20.0 | | | | | | | | | | | | | | |
| 2-Methyl-1,3-propanediol (214° C., 14.8) | | | | 15.0 | | | | | | | | | | | | | |
| 1,2-Butanediol (193° C., 12.8) | | | | | 15.0 | | | | | | | | | | | | |
| 1,2-Propanediol (188° C., 13.5) | | | | | | 15.0 | 8.0 | 9.0 | 36.0 | 37.0 | 15.0 | | | | | | |
| 3-Methoxy-3-methyl-butanol (174° C., 10.5) | | | | | | | | | | | | 20.0 | | | | | |
| Propylene glycol monomethyl ether (120° C., 11.3) | | | | | | | | | | | | | 5.0 | | | | |
| 1-Butanol (117° C., 11.3) | | | | | | | | | | | | | | 15.0 | 15.0 | 15.0 | 15.0 |
| Zonyl FS-3100 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 |
| BYK-333 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 |
| BYK-349 | | | | | | | | | | | | | | | | | |
| SURFYNO LDF-110D | | | | | | | | | | | | | | | | | |
| Ion-exchanged water | 39.6 | 39.6 | 39.6 | 39.6 | 39.6 | 39.6 | 46.6 | 45.6 | 18.6 | 17.6 | 39.6 | 39.6 | 39.6 | 39.6 | 39.6 | 39.6 | 39.6 |
| Content P (%) of pigment | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 |

TABLE 4-continued

Compositions and Characteristics of Inks

| | | | | | | | | | | | | | | | | | | | | | | |
|---|---|---|---|---|---|---|---|---|---|---|---|---|---|---|---|---|---|---|---|---|---|---|
| Content E (%) of resin particle | 9.0 | 9.0 | 9.0 | 9.0 | 9.0 | 9.0 | 9.0 | 9.0 | 9.0 | 9.0 | 9.0 | 9.0 | 9.0 | 9.0 | 9.0 | 9.0 | 9.0 | 9.0 | 9.0 | 9.0 | 9.0 | 9.0 |
| Content W (%) of wax particle | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| Content $S_1$ (%) of first water-soluble organic solvent | 15.0 | 15.0 | 0.0 | 0.0 | 15.0 | 15.0 | 15.0 | 8.0 | 9.0 | 36.0 | 37.0 | 20.0 | 15.0 | 15.0 | 15.0 | 15.0 | 15.0 | 15.0 | 15.0 | 15.0 | 15.0 | 15.0 |
| Content $S_2$ (%) of second water-soluble organic solvent | 5.0 | 5.0 | 5.0 | 5.0 | 20.0 | 5.0 | 5.0 | 5.0 | 5.0 | 5.0 | 5.0 | 0.0 | 5.0 | 5.0 | 5.0 | 5.0 | 5.0 | 5.0 | 5.0 | 5.0 | 5.0 | 5.0 |
| Value (times) of $S_1/E$ | 1.7 | 1.7 | 0.0 | 0.0 | 1.7 | 1.7 | 1.7 | 0.9 | 1.0 | 4.0 | 4.1 | 2.2 | 1.7 | 1.7 | 1.7 | 1.7 | 1.7 | 1.7 | 1.7 | 1.7 | 1.7 | 1.7 |
| Value (times) of E/P | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 |
| Value (times) of E/W | — | — | — | — | — | — | — | — | — | — | — | — | — | — | — | — | — | — | — | — | — | — |
| SP value $V_S$ of resin particle | 11.9 | 11.9 | 11.9 | 11.9 | 11.3 | 11.9 | 11.8 | 11.3 | 11.9 | 11.9 | 11.9 | 11.9 | 11.9 | 11.9 | 11.9 | 11.9 | 11.9 | 11.9 | 11.9 | 11.9 | 11.9 | 11.9 |
| SP value $V_1$ of first water-soluble organic solvent | 12.8 | 12.8 | 12.8 | 12.8 | 14.8 | 11.3 | 14.8 | 16.1 | 12.8 | 12.8 | 12.8 | 14.8 | 12.8 | 12.8 | 12.8 | 12.8 | 12.8 | 12.8 | 12.8 | 12.8 | 12.8 | 12.8 |
| SP value $V_2$ of second water-soluble organic solvent | 12.6 | 12.6 | 12.6 | 12.6 | 11.8 | 11.8 | 12.6 | 12.6 | 12.6 | 12.6 | 12.6 | 14.8 | 11.8 | 13.5 | 12.8 | 15.9 | 16.4 | 12.6 | 12.6 | 12.6 | 12.6 | 12.6 |
| $V_S - V_1$ | 0.9 | 0.9 | 0.6 | 0.6 | 2.9 | 0.1 | 3.5 | 4.2 | 0.9 | 0.9 | 0.9 | 2.9 | 0.9 | 0.9 | 0.9 | 0.9 | 0.9 | 0.9 | 0.9 | 0.9 | 0.9 | 0.9 |
| $V_S - V_2$ | 0.7 | 0.7 | 0.7 | 0.7 | 0.7 | 0.1 | 1.3 | 0.7 | 0.7 | 0.7 | 0.7 | 2.9 | 0.1 | 1.6 | 0.9 | 4.0 | 4.5 | 0.7 | 0.7 | 0.7 | 0.7 | 0.7 |
| Anionic group amount $A_P$ (μmol/g) of pigment | 536 | 536 | 536 | 536 | 536 | 536 | 536 | 536 | 536 | 536 | 536 | 536 | 536 | 536 | 536 | 536 | 536 | 536 | 536 | 322 | 429 | 536 |
| Anionic group amount $A_E$ (μmol/g) of particle | 71 | 71 | 71 | 71 | 71 | 71 | 71 | 71 | 71 | 71 | 71 | 71 | 71 | 71 | 71 | 71 | 71 | 71 | 71 | 71 | 71 | 71 |

TABLE 4-continued

Compositions and Characteristics of Inks

| | Ink | | | | | | | | | | | | | | | | | | | |
|---|---|---|---|---|---|---|---|---|---|---|---|---|---|---|---|---|---|---|---|---|
| | 22 | 23 | 24 | 25 | 26 | 27 | 28 | 29 | 30 | 31 | 32 | 33 | 34 | 35 | 36 | 37 | 38 | 39 | 40 | 41 |
| Value (times) of $A_P/A_E$ | 7.5 | 7.5 | 7.5 | 7.5 | 7.5 | 7.5 | 7.5 | 7.5 | 7.5 | 7.5 | 7.5 | 7.5 | 7.5 | 7.5 | 7.5 | 7.5 | 7.5 | 4.5 | 6.0 | 7.5 |
| Kind of pigment dispersion liquid | 1 | 1 | 1 | 1 | 1 | 1 | 1 | 1 | 1 | 1 | 1 | 1 | 1 | 1 | 1 | 1 | 1 | 1 | 1 | 4 |
| Kind of resin particle | 5 | 6 | 7 | 1 | 1 | 1 | 1 | 1 | 1 | 1 | 1 | 1 | 10 | 11 | 12 | 8 | 3 | 10 | 11 | 9 |
| Kind of wax particle | — | — | — | — | — | — | 1 | 2 | 1 | 1 | 1 | 1 | — | — | — | — | — | — | — | 3 |
| Pigment dispersion liquid | 10.0 | 10.0 | 10.0 | 30.0 | 20.0 | 10.0 | 10.0 | 10.0 | 10.0 | 10.0 | 10.0 | 10.0 | 10.0 | 10.0 | 10.0 | 10.0 | 10.0 | 10.0 | 10.0 | 29.2 |
| Liquid containing resin particle | 30.0 | 30.0 | 30.0 | 30.0 | 30.0 | 50.0 | 30.0 | 30.0 | 30.0 | 30.0 | 30.0 | 30.0 | 30.0 | 30.0 | 30.0 | 30.0 | 30.0 | 13.0 | 30.0 | 30.0 |
| Aqueous dispersion liquid of wax particle | | | | | | | 2.0 | 2.0 | 16.0 | 15.0 | 1.0 | 0.9 | | | | | | | | 3.3 |
| Tetraethylene glycol (327° C., 12.8) | | | | | | | | | | | | | | | | | | | | |
| 2-Hydroxyethyl-2-pyrrolidone (309° C., 13.5) | | | | | | | | | | | | | | | | | | | | |
| Trimethylol propane (296° C., 15.9) | | | | | | | | | | | | | | | | | | | | |
| Glycerin (290° C., 16.4) | | | | | | | | | | | | | | | | | | 4.0 | | |
| Diethylene glycol (246° C., 15.0) | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 | | | |
| 2-Pyrrolidone (245° C., 12.6) | | | | | | | | | | | | | | | | | | 5.0 | | |
| Dipropylene glycol (245° C., 13.6) | | | | | | | | | | | | | | | | | | | | |
| Diethylene glycol mono-2-ethylhexyl (229° C., 9.9) | | | | | | | | | | | | | | | | | | | 1.0 | |
| 1,2-Hexanediol (223° C., 11.8) | | | | | | | | | | | | | | | | | | 6.0 | | |
| 1,3-Propanediol (214° C., 16.1) | | | | | | | | | | | | | | | | | | | 5.0 | 5.0 |
| 2-Methyl 1,3-propanediol (214° C., 14.8) | | | | | | | | | | | | | | | | | | | | |

TABLE 4-continued

Compositions and Characteristics of Inks

| | | | | | | | | | | | | | | | | | | |
|---|---|---|---|---|---|---|---|---|---|---|---|---|---|---|---|---|---|---|
| 1,2-Butanediol (193° C., 12.8) | 20.0 | 15.0 | 15.0 | 15.0 | 15.0 | 15.0 | 15.0 | 15.0 | 15.0 | 15.0 | 15.0 | | 15.0 | 15.0 | 15.0 | 15.0 | 15.0 | 15.0 |
| 1,2-Propanediol (188° C., 13.5) | | | | | | | | | | 15.0 | | | | | | | | |
| 3-Methoxy-3-methylbutanol (174° C., 10.5) | | | | | | | | | | | 15.0 | | | | | | | |
| Propylene glycol monomethyl ether (120° C., 11.3) | | | | | | | | | | | | 15.0 | | | | | | |
| 1-Butanol (117° C., 11.3) | | | | | | | | | | | | | | | | | | |
| Zonyl FS-3100 | | | | | | | | | | | | | | | | | | 0.5 |
| BYK-333 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | |
| BYK-349 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | |
| SURFYNO LDF-110D | | | | | | | | | | | | | | | | | | 0.2 |
| Ion-exchanged water | 34.6 | 39.6 | 39.6 | 29.6 | 19.6 | 37.6 | 37.6 | 23.6 | 24.6 | 38.6 | 38.7 | 39.6 | 39.6 | 39.6 | 39.6 | 55.6 | 39.6 | 15.8 |
| Content P (%) of pigment | 3.0 | 3.0 | 3.0 | 6.0 | 3.0 | 3.0 | 3.0 | 3.0 | 3.0 | 3.0 | 3.0 | 3.0 | 3.0 | 3.0 | 3.0 | 3.0 | 3.0 | 8.8 |
| Content E (%) of resin particle | 9.0 | 9.0 | 9.0 | 9.0 | 15.0 | 9.0 | 9.0 | 9.0 | 9.0 | 9.0 | 9.0 | 9.0 | 9.0 | 9.0 | 9.0 | 3.9 | 9.0 | 9.0 |
| Content W (%) of wax particle | 0.0 | 0.0 | 0.0 | 0.0 | 0.0 | 0.6 | 0.6 | 4.8 | 4.5 | 0.30 | 0.27 | 0.0 | 0.0 | 0.0 | 0.0 | 0.0 | 0.0 | 1.0 |
| Content $S_1$ (%) of first water-soluble organic solvent | 20.0 | 15.0 | 15.0 | 15.0 | 15.0 | 15.0 | 15.0 | 15.0 | 15.0 | 15.0 | 15.0 | 15.0 | 15.0 | 15.0 | 15.0 | 0.0 | 15.0 | 15.0 |
| Content $S_2$ (%) of second water-soluble organic solvent | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 | 0.0 | 5.0 | 6.0 |
| Value (times) of $S_1/E$ | 2.2 | 1.7 | 1.7 | 1.7 | 1.0 | 1.7 | 1.7 | 1.7 | 1.7 | 1.7 | 1.7 | 1.7 | 1.7 | 1.7 | 1.7 | 0.0 | 1.7 | 1.7 |
| Value (times) of E/P | 3.0 | 3.0 | 3.0 | 1.5 | — | 3.0 | 3.0 | 3.0 | 3.0 | 3.0 | 3.0 | 3.0 | 3.0 | 3.0 | 3.0 | 1.3 | 3.0 | 1.0 |
| Value (times) of E/W | — | — | — | — | 15.0 | 15.0 | 15.0 | 1.9 | 2.0 | 30.0 | 33.3 | — | — | — | — | — | — | 9.0 |
| SP value $V_S$ of resin particle | 11.9 | 11.9 | 11.9 | 11.9 | 11.9 | 11.9 | 11.9 | 11.9 | 11.9 | 11.9 | 11.9 | 9.9 | 10.8 | 11.9 | 11.3 | 9.9 | 9.9 | 11.9 |
| SP value $V_1$ of first water-soluble organic solvent | 12.8 | 12.8 | 12.8 | 12.8 | 12.8 | 12.8 | 12.8 | 12.8 | 12.8 | 12.8 | 12.8 | 10.5 | 10.5 | 12.8 | 12.8 | 11.8 | 12.8 | 12.8 |
| SP value $V_2$ of second water-soluble organic solvent | 12.6 | 12.6 | 12.6 | 12.6 | 12.6 | 12.6 | 12.6 | 12.6 | 12.6 | 12.6 | 12.6 | 12.6 | 12.6 | 12.6 | 12.6 | 18.3 | 12.6 | 11.5 |

TABLE 4-continued

Compositions and Characteristics of Inks

| | | | | | | | | | | | | | | | | | | | | | | |
|---|---|---|---|---|---|---|---|---|---|---|---|---|---|---|---|---|---|---|---|---|---|---|
| $V_S - V_1$ | 0.9 | 0.9 | 0.9 | 0.9 | 0.9 | 0.9 | 0.9 | 0.9 | 0.9 | 0.9 | 0.9 | 0.9 | 0.9 | 0.9 | 0.6 | 0.3 | 0.1 | 0.9 | 1.5 | 1.9 | 2.9 | 0.9 |
| $V_S - V_2$ | 0.7 | 0.7 | 0.7 | 0.7 | 0.7 | 0.7 | 0.7 | 0.7 | 0.7 | 0.7 | 0.7 | 0.7 | 0.7 | 0.7 | 2.7 | 1.8 | 2.2 | 0.7 | 1.3 | 8.4 | 2.7 | 0.4 |
| Anionic group amount $A_P$ (μmol/g) of pigment | 536 | 536 | 536 | 536 | 536 | 536 | 536 | 536 | 536 | 536 | 536 | 536 | 536 | 536 | 536 | 536 | 536 | 536 | 536 | 536 | 536 | 398 |
| Anionic group amount $A_E$ (μmol/g) of particle | 71 | 71 | 71 | 71 | 71 | 71 | 71 | 71 | 71 | 71 | 71 | 71 | 71 | 71 | 650 | 71 | 71 | 71 | 71 | 650 | 71 | 71 |
| Value (times) of $A_P/A_E$ | 7.5 | 7.5 | 7.5 | 7.5 | 7.5 | 7.5 | 7.5 | 7.5 | 7.5 | 7.5 | 7.5 | 7.5 | 7.5 | 7.5 | 0.8 | 7.5 | 7.5 | 7.5 | 7.5 | 0.8 | 7.5 | 5.6 |

Evaluation

The following recording apparatus 1 and 2 each including a recording head of an ink jet system and recording media 1 and 2 were prepared. The recording medium 1 is a recording medium having a water absorption amount of 10 mL/m² or less in the Bristow method from the start of contact to 30 msec$^{1/2}$. Meanwhile, the recording medium 2 is a recording medium having a water absorption amount of more than 10 mL/m² in the Bristow method from the start of contact to 30 msec$^{1/2}$. In the present disclosure, "AAA", "AA", "A" and "B" in evaluation criteria for each item described below were defined as acceptable levels, and "C" was defined as an unacceptable level. Evaluation results are shown in Table 5.

- Recording apparatus 1 (product name: "Pixus Pro-2000", manufactured by Canon Inc.), including a recording head configured to eject an ink through action of thermal energy, and having a mechanism configured to heat the ink in the recording head.
- Recording apparatus 2 (product name: "PX-G5300", manufactured by Seiko Epson Corporation), including a recording head configured to eject an ink through action of physical energy, and being free of a mechanism configured to heat the ink in the recording head.
- Recording medium 1: product name: "Scotchcal Graphic Film IJ1220", manufactured by 3M, material: polyvinyl chloride
- Recording medium 2: high-quality dedicated paper, product name "HR-101S", manufactured by Canon Inc.

Ejection Stability

Each ink was filled into an ink cartridge, which was mounted onto the ink jet recording apparatus. Under the conditions of a temperature of 25° C. and a relative humidity of 50%, a solid image measuring 27 cm by 38 cm was continuously recorded on 100 sheets of an A3 size recording medium under such a condition that 32 ng of the ink was applied to a unit region measuring 1/600 inch by 1/600 inch and conditions shown in Table 5. After the 100-sheet recording, a nozzle check pattern was recorded, the ratio of ejection orifices at each of which non-ejection occurred was determined, and the ejection stability of the ink was evaluated in accordance with the following evaluation criteria.

A: The ratio of ejection orifices at each of which non-ejection occurred was 0% of all ejection orifices.
B: The ratio of ejection orifices at each of which non-ejection occurred was less than 80% of all ejection orifices.
C: The ratio of ejection orifices at each of which non-ejection occurred was 80% or more of all ejection orifices.

Abrasion Resistance

Each ink was filled into an ink cartridge, which was mounted onto the ink jet recording apparatus. Under the conditions of a temperature of 2.5° C. and a relative humidity of 50%, a solid image measuring 27 cm by 38 cm was recorded on an A3 size recording medium under such a condition that 32 ng of the ink was applied to a unit region measuring 1/600 inch by 1/600 inch and conditions shown in Table 5. An abrasion resistance tester (manufactured by Tester Sangyo Co., Ltd.) that was a Gakushin-type tester in conformity with JIS L0849 was used to perform a friction test involving 150 rounds of reciprocating a white cloth (cotton) for friction specified in JIS L0803 on the surface of the recorded image at a load of 500 g. The image after the friction test was visually observed, and the abrasion resistance of the image was evaluated in accordance with the following evaluation criteria.

AAA: No scratch was found on the image after 300 rounds of reciprocation.
AA: A scratch was found on the image after 300 rounds of reciprocation, but no scratch was found on the image after 150 rounds of reciprocation.
A: A scratch was found on the image after 150 rounds of reciprocation, but no scratch was found on the image after 50 rounds of reciprocation.
B: A scratch was found on the image after 50 rounds of reciprocation, but the white background of the recording medium was not visible.
C: A scratch was found on the image after 50 rounds of reciprocation, and the white background of the recording medium was visible.

TABLE 5

Evaluation Conditions and Evaluation Results

| | | | | | Evaluation conditions | | | Evaluation results | |
|---|---|---|---|---|---|---|---|---|---|
| | | Ink | Recording apparatus | Recording medium | Ink heating temperature $T_H$ (° C.) in recording head | Heating temperature $T_F$ (° C.) of recording medium | Heat quantity Q (W·h/g) | Ejection stability | Abrasion resistance |
| Example | 1 | 1 | 1 | 1 | 50 | 80 | 3 | A | AA |
| | 2 | 2 | 1 | 1 | 50 | 80 | 3 | A | AA |
| | 3 | 1 | 1 | 1 | 54 | 64 | 3 | A | AA |
| | 4 | 1 | 1 | 1 | 50 | 64 | 3 | A | AA |
| | 5 | 1 | 1 | 1 | 50 | 80 | 2 | A | AA |
| | 6 | 1 | 1 | 1 | 35 | 80 | 3 | A | A |
| | 7 | 1 | 1 | 1 | 40 | 80 | 3 | A | AA |
| | 8 | 1 | 1 | 1 | 50 | 90 | 3 | A | AA |
| | 9 | 1 | 1 | 1 | 50 | 95 | 3 | A | A |
| | 10 | 3 | 1 | 1 | 50 | 80 | 3 | B | A |
| | 11 | 4 | 1 | 1 | 50 | 80 | 3 | A | AA |
| | 12 | 5 | 1 | 1 | 50 | 80 | 3 | A | AA |
| | 13 | 6 | 1 | 1 | 50 | 80 | 3 | A | A |
| | 14 | 7 | 1 | 1 | 50 | 80 | 3 | A | AA |
| | 15 | 8 | 1 | 1 | 50 | 80 | 3 | A | A |
| | 16 | 9 | 1 | 1 | 50 | 80 | 3 | A | A |

TABLE 5-continued

Evaluation Conditions and Evaluation Results

| | | Ink | Recording apparatus | Recording medium | Ink heating temperature $T_H$ (° C.) in recording head | Heating temperature $T_F$ (° C.) of recording medium | Heat quantity Q (W·h/g) | Ejection stability | Abrasion resistance |
|---|---|---|---|---|---|---|---|---|---|
| | 17 | 10 | 1 | 1 | 50 | 80 | 3 | A | AA |
| | 18 | 11 | 1 | 1 | 50 | 80 | 3 | A | AA |
| | 19 | 12 | 1 | 1 | 50 | 80 | 3 | B | AA |
| | 20 | 13 | 1 | 1 | 50 | 80 | 3 | A | A |
| | 21 | 14 | 1 | 1 | 50 | 80 | 3 | A | AA |
| | 22 | 15 | 1 | 1 | 50 | 80 | 3 | A | AA |
| | 23 | 16 | 1 | 1 | 50 | 80 | 3 | A | A |
| | 24 | 17 | 1 | 1 | 50 | 80 | 3 | A | AA |
| | 25 | 18 | 1 | 1 | 50 | 80 | 3 | A | A |
| | 26 | 19 | 1 | 1 | 50 | 80 | 3 | A | A |
| | 27 | 20 | 1 | 1 | 50 | 80 | 3 | A | AA |
| | 28 | 21 | 1 | 1 | 50 | 80 | 3 | A | A |
| | 29 | 22 | 1 | 1 | 50 | 80 | 3 | A | AA |
| | 30 | 23 | 1 | 1 | 50 | 80 | 3 | A | AA |
| | 31 | 24 | 1 | 1 | 50 | 80 | 3 | A | A |
| | 32 | 25 | 1 | 1 | 50 | 80 | 3 | A | A |
| | 33 | 26 | 1 | 1 | 50 | 80 | 3 | A | AA |
| | 34 | 27 | 1 | 1 | 50 | 80 | 3 | A | AA |
| | 35 | 28 | 1 | 1 | 50 | 80 | 3 | A | AAA |
| | 36 | 29 | 1 | 1 | 50 | 80 | 3 | A | AA |
| | 37 | 30 | 1 | 1 | 50 | 80 | 3 | A | AA |
| | 38 | 31 | 1 | 1 | 50 | 80 | 3 | A | AAA |
| | 39 | 32 | 1 | 1 | 50 | 80 | 3 | A | AAA |
| | 40 | 33 | 1 | 1 | 50 | 80 | 3 | A | AA |
| Comparative Example | 1 | 1 | 1 | 1 | — | 80 | 3 | C | B |
| | 2 | 1 | 1 | 1 | 50 | — | 0 | A | C |
| | 3 | 34 | 1 | 1 | 50 | 80 | 3 | C | AA |
| | 4 | 35 | 1 | 1 | 50 | 80 | 3 | C | AA |
| | 5 | 36 | 1 | 1 | 50 | 80 | 3 | A | C |
| | 6 | 37 | 1 | 1 | 50 | 80 | 3 | C | AA |
| | 7 | 38 | 1 | 1 | 60 | 80 | 3 | C | AA |
| | 8 | 1 | 1 | 1 | 50 | 55 | 3 | A | C |
| | 9 | 1 | 1 | 1 | 50 | 63 | 3 | A | C |
| | 10 | 1 | 1 | 1 | 50 | 80 | 1 | A | C |
| | 11 | 39 | 1 | 1 | — | 80 | 3 | A | C |
| | 12 | 39 | 1 | 1 | 50 | 80 | 3 | C | B |
| | 13 | 1 | 1 | 2 | 50 | 80 | 3 | A | C |
| | 14 | 35 | 1 | 2 | 50 | 80 | 3 | C | C |
| Reference Example | 1 | 40 | 2 | 1 | — | 80 | 3 | A | AA |
| | 2 | 41 | 2 | 1 | — | 80 | 3 | A | AA |

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-147159, filed Sep. 9, 2021, Japanese Patent Application No. 2021-147158, flied Sep. 9, 2021, and Japanese Patent Application No. 2022-127993, filed Aug. 10, 2022, which are hereby incorporated by reference herein in their entirety.

What is claimed is:

1. An ink jet recording method including ejecting an aqueous ink from a recording head of an ink jet system through action of thermal energy to apply the aqueous ink to a recording medium, to thereby record an image, the ink jet recording method comprising:

ejecting the aqueous ink heated to a temperature $T_H$ (° C.) from the recording head to apply the aqueous ink to the recording medium; and heating the recording medium having the aqueous ink applied thereto to a temperature $T_F$ (° C.), the aqueous ink containing a pigment and a polyester resin particle, the polyester resin particle having a ratio of a weight average molecular weight to a number average molecular weight of 6.0 or less, a glass transition temperature $T_G$ (° C.) of the polyester resin particle, the temperature $T_H$ (° C.) and the temperature $T_F$ (° C.) satisfying relationships of the following expressions (1) to (3), a heat quantity ((W·h)/g) to be applied to the aqueous ink applied to the recording medium being 2 (W·h)/g or more, the recording medium having a water absorption amount of 10 mL/m$^2$ or less in a Bristow method from start of contact to 30 msec$^{1/2}$.

$$T_G (° C.) > T_H (° C.) \qquad (1)$$

$$T_F (° C.) \geq T_H (° C.) + 10° C. \qquad (2)$$

$$T_F (° C.) \geq T_G (° C.) - 10° C. \qquad (3)$$

2. The ink jet recording method according to claim 1, wherein the temperature $T_H$ (° C.) is 40° C. or more, and wherein the temperature $T_F$ (° C.) is 90° C. or less.

3. The ink jet recording method according to claim 1, wherein the aqueous ink further contains a first water-soluble organic solvent having a boiling point of from 120° C. or more to 220° C. or less, and wherein the first water-soluble organic solvent has a largest content by mass) among all water-soluble organic solvents in the aqueous ink.

4. The ink jet recording method according to claim 3, wherein a difference between an SP value of the first water-soluble organic solvent and an SP value of the polyester resin particle is 4.0 or less, and wherein the content (% by mass) of the first water-soluble organic solvent in the aqueous ink is from 1.0 times or more to 4.0 times or less in terms of mass ratio with respect to a content (% by mass) of the polyester resin particle.

5. The ink jet recording method according to claim 1, wherein the aqueous ink further contains a second water-soluble organic solvent having a boiling point of from more than 220° C. to 310° C. or less, and wherein a difference between an SP value of the second water-soluble organic solvent and an SP value of the polyester resin particle is 4.0 or less.

6. The ink jet recording method according to claim 1, wherein the pigment is dispersed in the aqueous ink through action of an anionic group, and wherein an anionic group amount (μmol/g) of the pigment is 6.0 times or more in terms of ratio with respect to an anionic group amount (μmol/g) of the polyester resin particle.

7. The ink jet recording method according to claim 1, wherein the weight average molecular weight of the polyester resin particle is from 30,000 or more to 70,000 or less.

8. The ink jet recording method according to claim 1, wherein a content (% by mass) of the polyester resin particle in the aqueous ink is 1.5 times or more in terms of mass ratio with respect to a content (% by mass) of the pigment.

9. The ink jet recording method according to claim 1, wherein the aqueous ink further contains a wax particle formed of at least one kind of wax selected from the group consisting of: a Fischer-Tropsch wax; a polyolefin wax; and an α-olefin/maleic anhydride copolymer, and wherein a content (% by mass) of the polyester resin particle in the aqueous ink is from 2.0 times or more to 30.0 times or less in terms of mass ratio with respect to a content (% by mass) of the wax particle.

10. An ink jet recording apparatus to be used in an ink jet recording method including ejecting an aqueous ink from a recording head of an ink jet system through action of thermal energy to apply the aqueous ink to a recording medium, to thereby record an image, the ink jet recording apparatus comprising:
a mechanism configured to heat the aqueous ink to be ejected from the recording head and applied to the recording medium to a temperature $T_H$ (° C.); and
a mechanism configured to heat the recording medium having the aqueous ink applied thereto to a temperature $T_F$ (° C.),
the aqueous ink containing a pigment and a polyester resin particle,
the polyester resin particle having a ratio of a weight average molecular weight to a number average molecular weight of 6.0 or less,
a glass transition temperature $T_G$ (° C.) of the polyester resin particle, the temperature $T_H$ (° C.) and the temperature $T_F$ (° C.) satisfying relationships of the following expressions (1) to (3),
a heat quantity (W·h)/g) to be applied to the aqueous ink applied to the recording medium being 2 (W·h)/g or more,
the recording medium having a water absorption amount of 10 mL/m² or less in a Bristow method from start of contact to 30 msec$^{1/2}$.

$$T_G(° C.) > T_H(° C.) \tag{1}$$

$$T_F(° C.) \geq T_H(° C.) + 10° C. \tag{2}$$

$$T_F(° C.) \geq T_G(° C.) - 10° C. \tag{3}$$

* * * * *